United States Patent
Tsuchiya

(10) Patent No.: US 11,487,633 B2
(45) Date of Patent: Nov. 1, 2022

(54) COMMUNICATION PROCESSING APPARATUS, COMMUNICATION PROCESSING METHOD, AND NON-TRANSITORY COMPUTER-READABLE RECORDING MEDIUM

(71) Applicant: Yokogawa Electric Corporation, Musashino (JP)

(72) Inventor: Masanobu Tsuchiya, Musashino (JP)

(73) Assignee: Vokosawa Electric Corporation, Tokyo (JP)

( * ) Notice: Subject to any disclaimer, the term of this patent is extended or adjusted under 35 U.S.C. 154(b) by 45 days.

(21) Appl. No.: 17/064,717

(22) Filed: Oct. 7, 2020

(65) Prior Publication Data
US 2021/0103505 A1    Apr. 8, 2021

(30) Foreign Application Priority Data
Oct. 8, 2019   (JP) .............. JP2019-185257

(51) Int. Cl.
   *G06F 11/14*      (2006.01)
   *G06F 11/07*      (2006.01)
   *G06F 9/455*      (2018.01)

(52) U.S. Cl.
   CPC ...... *G06F 11/1484* (2013.01); *G06F 9/45558* (2013.01); *G06F 11/076* (2013.01); *G06F 11/079* (2013.01); *G06F 11/0772* (2013.01); G06F 2009/45591 (2013.01); G06F 2009/45595 (2013.01)

(58) Field of Classification Search
   CPC ............ G06F 11/1484; G06F 11/076; G06F 11/0772; G06F 11/079; G06F 2008/45595; G06F 2008/45591; G06F 9/45558
   See application file for complete search history.

(56) References Cited

U.S. PATENT DOCUMENTS

2012/0226796 A1* 9/2012 Morgan ................. H04L 67/10
                                                       709/224
2012/0278800 A1* 11/2012 Nicholas ............. G06F 9/45558
                                                       718/1

(Continued)

OTHER PUBLICATIONS

Kouji Demachi et al., "Vnet/IP Real-Time Plant Network System", Yokogawa Technical Report, 2005, 8pages, vol. 49, No. 2.

*Primary Examiner* — Jigar P Patel
(74) *Attorney, Agent, or Firm* — Sughrue Mion, PLLC

(57) ABSTRACT

In a communication processing apparatus used in a production control system, a real-time communication unit detects a diagnostic index related to communication processing and provides a notification of the possibility of unstable operation to a resource adjustment judging unit when the value of the diagnostic index exceeds a predetermined threshold. The resource adjustment judging unit judges whether a virtual processor is free when the notification is received from the real-time communication unit, instructs a virtualization unit to add the virtual processor to the virtual machine that has the possibility of unstable operation when the virtual processor is free, and instructs the virtualization unit to add a virtual processor allocated to a virtual machine with low operation priority to the virtual machine that has the possibility of unstable operation when no virtual processor is free.

7 Claims, 12 Drawing Sheets

(56) References Cited

U.S. PATENT DOCUMENTS

| | | | |
|---|---|---|---|
| 2014/0082201 A1* | 3/2014 | Shankari | H04L 41/5025 709/226 |
| 2015/0169350 A1* | 6/2015 | Anand | G06F 9/5077 718/1 |
| 2017/0063484 A1* | 3/2017 | Naghshvar | H04L 69/22 |
| 2020/0401456 A1* | 12/2020 | Sivak | G06F 9/45558 |

* cited by examiner

FIG. 6

| Operation priority | Virtual machine ID | Operating application | Notes |
|---|---|---|---|
| 1 | VM1 | | |
| 1 | VM3 | | Running on two machines, VM3 and VM4 |
| 2 | * | Application to coordinate with maintenance personnel tablet | |
| 2 | VM2 | | |
| 3 | VM4 | | Running on two machines, VM3 and VM4 |
| 4 | * | I/O module predictive maintenance application | Operating cycle of once per week |

COMMUNICATION PROCESSING APPARATUS, COMMUNICATION PROCESSING METHOD, AND NON-TRANSITORY COMPUTER-READABLE RECORDING MEDIUM

CROSS-REFERENCE TO RELATED APPLICATION

The present application claims priority to and the benefit of Japanese Patent Application No. 2019-185257 filed Oct. 8, 2019, the entire contents of which are incorporated herein by reference.

TECHNICAL FIELD

The present disclosure relates to a communication processing apparatus, a communication processing method, and a non-transitory computer-readable recording medium.

BACKGROUND

Real-time communication is required in particular in production control systems or the like. One method for communicating in real time is to use a standard communication technique such as Ethernet or Internet protocol (IP).

To achieve real-time communication, non-patent literature (NPL) 1 discloses a technique to avoid packet loss by, for example, allocating a time slot to each transmitting station. The technique in NPL 1 uses an open standard protocol, as illustrated in FIG. 4, for example, to enable a network configuration with multivendor equipment.

CITATION LIST

Non-Patent Literature

NPL 1: Koji Demachi et al., "Vnet/IP Real-time Plant Network System", Yokogawa Technical Report, Vol. 49, No. 2, 2005

SUMMARY

A communication processing apparatus according to an embodiment is a communication processing apparatus to be used in a production control system and includes an application unit and a real-time communication unit, operating on each virtual machine among a plurality of virtual machines implemented by a virtualization unit included in a computer, and a resource adjustment judging unit. The real-time communication unit is configured to detect a diagnostic index related to communication processing and to provide a notification of a possibility of unstable operation to the resource adjustment judging unit when a value of the diagnostic index exceeds a predetermined threshold. The resource adjustment judging unit is configured to judge whether a virtual processor is free when the notification is received from the real-time communication unit; instruct the virtualization unit to add the virtual processor to the virtual machine that has the possibility of unstable operation when the virtual processor is free; and instruct the virtualization unit to add a virtual processor allocated to a virtual machine with low operation priority to the virtual machine that has the possibility of unstable operation when no virtual processor is free.

A non-transitory computer-readable recording medium according to an embodiment includes instructions which, when executed by a computer, cause the computer to function as the communication processing apparatus.

A communication processing method according to an embodiment uses a communication processing apparatus in a production control system, the communication processing apparatus comprising an application unit and a real-time communication unit operating on each virtual machine among a plurality of virtual machines implemented by a virtualization unit included in a computer, the communication processing method including: detecting, using the real-time communication unit, a diagnostic index related to communication processing and providing a notification of a possibility of unstable operation to a resource adjustment judging unit when a value of the diagnostic index exceeds a predetermined threshold; judging, using the resource adjustment judging unit, whether a virtual processor is free when the notification is received from the real-time communication unit; instructing the virtualization unit, using the resource adjustment judging unit, to add the virtual processor to the virtual machine that has the possibility of unstable operation when the virtual processor is free; and instructing the virtualization unit, using the resource adjustment judging unit, to add a virtual processor allocated to a virtual machine with low operation priority to the virtual machine that has the possibility of unstable operation when no virtual processor is free.

BRIEF DESCRIPTION OF THE DRAWINGS

In the accompanying drawings:

FIG. 6 illustrates a virtual machine operation priority table of FIG. 4;

DETAILED DESCRIPTION

Figure 1:
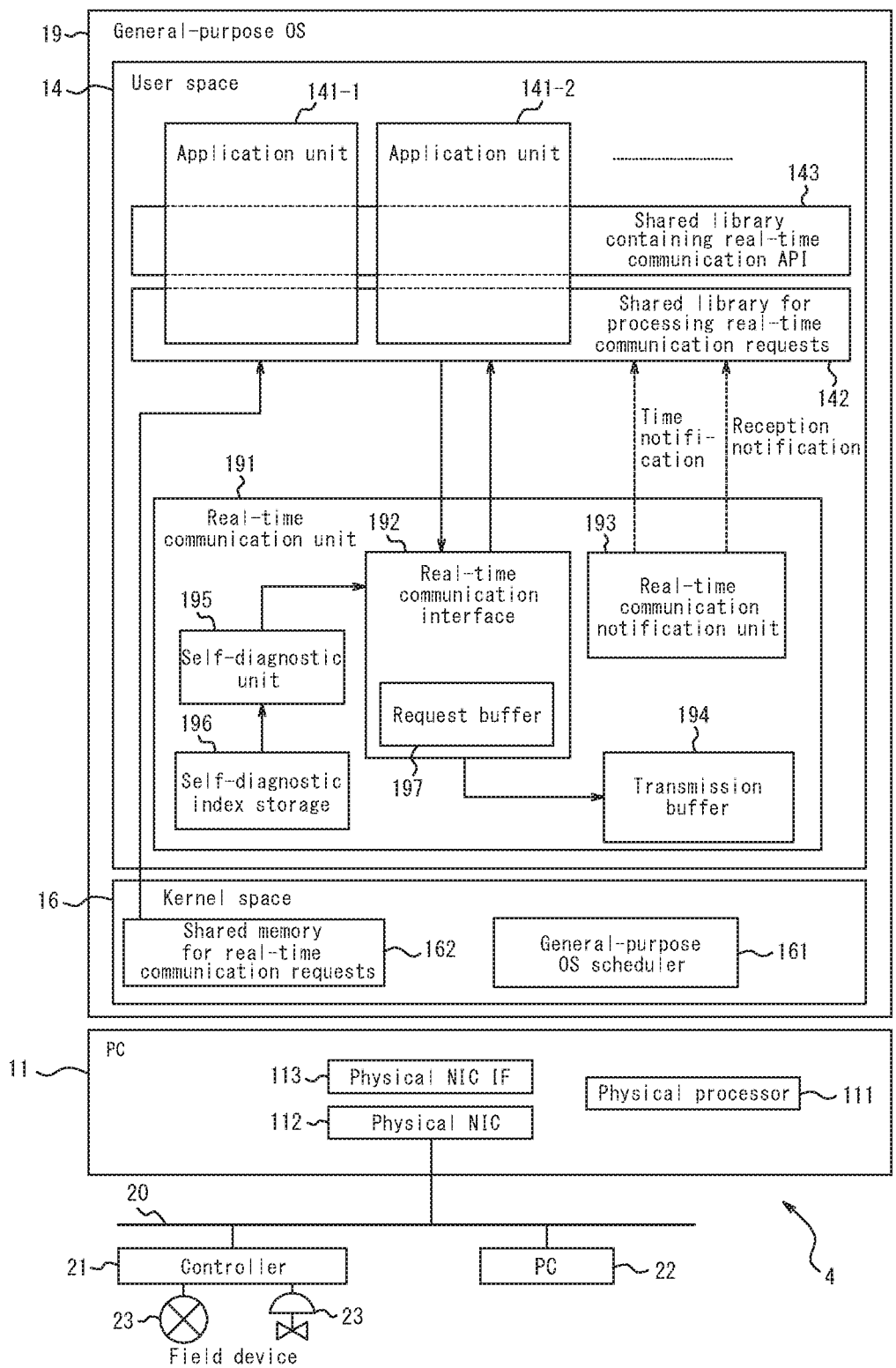
FIG. 1 is a functional block diagram illustrating the configuration of a communication processing apparatus according to a comparative example.

In a network system configured for controlling a plant, demand exists for using general-purpose products to implement devices belonging to the network system. In particular, incorporating general-purpose products in devices belonging to the network system while ensuring real-time responsiveness is expected to reduce the price of devices and stabilize supply. For example, a computer could be used as a communication processing apparatus that communicates in real time, and an operating system (OS) such as Windows® (Windows is a registered trademark in Japan, other countries, or both), which is more general-purpose than Linux® (Linux is a registered trademark in Japan, other countries, or both) or the like, could be used to control programs operating on the computer.

The following problems arise on the above-described communication processing apparatus, however, when a general-purpose OS scheduler is used as is to allocate computational resources to a plurality of tasks operating simultaneously in parallel. For example, a known general-purpose OS scheduler might not be able to allocate computational resources appropriately on a communication processing apparatus that includes an application unit for executing processing for plant control and a real-time communication unit for processing communication requests from the application unit in real-time. Specifically, to ensure real-time responsiveness on a communication processing apparatus that uses a general-purpose OS scheduler, the priority of the task of the real-time communication unit is set higher than the priority of the task of the application unit. In general, however, when CPU usage of a high priority task exceeds a predetermined threshold, a general-purpose OS scheduler operates under logic that does not provide the task with computational resources, but rather allocates computational resources to a task with a lower priority. The real-time communication unit therefore cannot use sufficient computational resources to process communication requests from the application unit. This leads to the problem of an inability to respond in real time.

It would therefore be helpful to provide a communication processing system, a communication processing method, and a non-transitory computer-readable recording medium capable of ensuring the real-time responsiveness necessary for a production control system while using a general-purpose OS scheduler.

A communication processing apparatus according to an embodiment is a communication processing apparatus to be used in a production control system and includes an application unit and a real-time communication unit, operating on each virtual machine among a plurality of virtual machines implemented by a virtualization unit included in a computer, and a resource adjustment judging unit. The real-time communication unit is configured to detect a diagnostic index related to communication processing and to provide a notification of a possibility of unstable operation to the resource adjustment judging unit when a value of the diagnostic index exceeds a predetermined threshold. The resource adjustment judging unit is configured to judge whether a virtual processor is free when the notification is received from the real-time communication unit; instruct the virtualization unit to add the virtual processor to the virtual machine that has the possibility of unstable operation when the virtual processor is free; and instruct the virtualization unit to add a virtual processor allocated to a virtual machine with low operation priority to the virtual machine that has the possibility of unstable operation when no virtual processor is free.

In this way, a virtual machine that has little effect on the production control system is suspended to ensure real-time responsiveness of the real-time communication unit, without reducing the amount of processing by the real-time communication unit, even when no virtual processor is free to be allocated to a virtual machine that has a possibility of experiencing unstable operation.

In an embodiment, the real-time communication unit may be configured to provide the notification of the possibility of unstable operation to the resource adjustment judging unit when the value of the diagnostic index exceeds a first threshold and to adjust a time interval for processing a communication request from the application unit when the value of the diagnostic index exceeds a second threshold.

In this way, by adjusting the time interval for the real-time communication interface to process communication requests, the possibility of a virtual machine experiencing unstable operation can be reduced even when there is no virtual machine with low operation priority.

In an embodiment, the communication processing apparatus may include an application representative unit configured to operate as a task independent from the application unit, to receive a communication request from the application unit, to store the communication request in a dedicated storage in the task, and to retrieve the communication request from the storage and pass the communication request to the real-time communication unit.

In this way, by inclusion of the application representative unit, communication requests from the application units can only be read and written by the application representative unit, thereby ensuring safety.

In an embodiment, the real-time communication unit in the communication processing apparatus may be configured to operate as a task independent from the application unit.

In this way, by the real-time communication unit operating as a task independent from the application units, the real-time communication unit can communicate with another device without delay.

A non-transitory computer-readable recording medium according to an embodiment may include instructions which, when executed by a computer, cause the computer to function as the communication processing apparatus.

In this way, a virtual machine that has little effect on the production control system is suspended to ensure real-time responsiveness of the real-time communication unit, without reducing the amount of processing by the real-time communication unit, even when no virtual processor is free to be allocated to a virtual machine that has a possibility of experiencing unstable operation.

A communication processing method according to an embodiment uses a communication processing apparatus in a production control system, the communication processing apparatus comprising an application unit and a real-time communication unit operating on each virtual machine among a plurality of virtual machines implemented by a virtualization unit included in a computer, the communication processing method including: detecting, using the real-time communication unit, a diagnostic index related to communication processing and providing a notification of a possibility of unstable operation to a resource adjustment judging unit when a value of the diagnostic index exceeds a predetermined threshold; judging, using the resource adjustment judging unit, whether a virtual processor is free when the notification is received from the real-time communication unit; instructing the virtualization unit, using the resource adjustment judging unit, to add the virtual processor to the virtual machine that has the possibility of unstable operation when the virtual processor is free; and instructing the virtualization unit, using the resource adjustment judging unit, to add a virtual processor allocated to a virtual machine with low operation priority to the virtual machine that has the possibility of unstable operation when no virtual processor is free.

In this way, a virtual machine that has little effect on the production control system is suspended to ensure real-time responsiveness of the real-time communication unit, without reducing the amount of processing by the real-time communication unit, even when no virtual processor is free to be allocated to a virtual machine that has a possibility of experiencing unstable operation.

The present disclosure provides a communication processing system, a communication processing method, and a non-transitory computer-readable recording medium capable of ensuring the real-time responsiveness necessary for a production control system while using a general-purpose OS scheduler.

Embodiments of the present disclosure are described below with reference to the drawings. Identical reference signs in the drawings indicate identical or equivalent constituent elements.

First Embodiment

First, a configuration example of a communication processing apparatus 4 is described with reference to FIG. 1 for the sake of comparison.

As illustrated in FIG. 1, the communication processing apparatus 4 is configured on a PC 11 (physical PC), which is hardware. The PC 11 includes a physical processor 111, a physical NIC 112, and a physical NIC IF 113. The PC 11 may include other constituent elements, such as memory. The PC 11 is connected to a control network 20 via the physical NIC 112. The control network 20 is a network for communication between devices that form a production control system. Devices such as a controller 21 and a PC 22 are connected to the control network 20. The PC 22 can, for example, communicate with the controller 21 or the like over the control network 20. A plurality of field devices 23 are connected to the controller 21. The plant is controlled by control of the field devices 23. The field devices 23 are, for example, sensors such as a flow meter, temperature gauge, humidity gauge, or pressure gauge, or devices such as a valve, a pump, or an actuator. PC stands for "personal computer", NIC stands for "network interface card". An NIC may also simply be referred to as a "network card", IF stands for "interface".

The physical processor 111 consecutively fetches and executes commands included in a program loaded into memory. Examples of the physical processor include a physical CPU. Any number of cores may be included in the physical CPU. CPU stands for "central processing unit". The PC 11 may include a plurality of physical processors 111. The CPU time of the physical processor 111 is allocated to each function in user space, described below.

The physical NIC 112 has an interface function for communicating with an external device via the control network 20 connected to the PC 11. The physical NIC 112 may be a general-purpose NIC.

The physical NIC IF 113 provides an interface between programs on the PC 11 and the physical NIC 112.

A general-purpose OS 19 operates on the PC 11. The general-purpose OS 19 includes a user space 14 and a kernel space 16. OS stands for "operating system". Configuring the communication processing apparatus 4 by using a general-purpose OS 19 can reduce the cost of the communication processing apparatus 4 and achieve stable supply. Examples of the general-purpose OS 19 include a Windows® family OS, released by Microsoft Corporation (USA) as an OS for PCs.

A general-purpose OS scheduler 161 and a shared memory 162 for real-time communication requests are located in the kernel space 16. A shared memory may also be present in the kernel space 16 for use as necessary when information is to be shared between tasks operating in the user space 14.

In accordance with the priority of each function (task, program) operating simultaneously in parallel in the user space 14, the general-purpose OS scheduler 161 allocates computational resources as necessary and manages operation of each function. Computational resources as used herein are typically CPU time (CPU resources) but may include resources other than CPU time. For example, the computational resources include allocated memory, input/output processing means, and the like. The general-purpose OS scheduler 161 is not a real-time scheduler. Only one user space 14 is illustrated in FIG. 1, but the general-purpose OS scheduler 161 may manage a plurality of user spaces.

The shared memory 162 for real-time communication requests is memory capable of being accessed by all of the tasks operating in the user space 14. A buffer is provided inside the shared memory 162 for real-time communication requests. A shared library 142 for processing real-time communication requests, described below, temporarily stores communication requests or the like from application units 141-1, 141-2, . . . , in the buffer. The shared memory 162 for real-time communication requests is provided outside of the user space 14 and is mapped to a predetermined location inside the memory space of the application units 141-1, 141-2, . . . . Consequently, the application units 141-1, 141-2, . . . can access the shared memory 162 for real-time communication requests.

Application units 141-1, 141-2, . . . (application units 141), the shared library 142 for processing real-time communication requests, a shared library 143 containing a real-time communication API, and a real-time communication unit 191 are located in the user space 14. API stands for "application programming interface". The application units 141, the shared library 142 for processing real-time communication requests, the shared library 143 containing the real-time communication API, and the real-time communication unit 191 can be implemented using programs and memory. The programs are executed by the physical processor 111 allocated as appropriate by the general-purpose OS scheduler 161. The memory is implemented using a semiconductor or a magnetic recording medium, for example. The functions executed in the user space 14 need not always use the memory. Functions that only record information and do not execute processing do not need to use a program.

The application units 141 execute processing to control a plant and devices, for example. The application units 141 run software related to a human machine interface (HMI) for displaying measurement data of a plant and performing operations on the plant, an engineering server (ENG) on which the control program of the controller that controls the plant is created, a gateway, and applications of the controller or the like that controls the plant, for example. A plurality of application units 141 may operate simultaneously in parallel. The application unit 141 temporarily stores a communication request in the shared memory 162 for real-time communication requests shared by the plurality of application units 141. Subsequently, the application unit 141 passes the communication request retrieved from the shared memory 162 for real-time communication requests to the real-time communication unit 191. The communication request from the application unit 141 to the real-time communication unit 191 is to establish or release a logical communication channel, to transmit or receive a frame (a logical unit of data transmission/reception; also referred to as a packet), or the like. Any number of pieces of application software may operate in the user space 14.

The library functions of the shared library 142 for processing real-time communication requests and the shared library 143 containing the real-time communication API are incorporated into the application units 141. The functions of the shared library 142 for processing real-time communication requests and the shared library 143 containing the real-time communication API are linked to application logic as appropriate.

The shared library 142 for processing real-time communication requests may be statically linked to the application units 141 or may operate as an independent task. The shared library 142 for processing real-time communication requests includes the functions of logic for real-time communication request reception, logic for real-time communication transmission, and logic for real-time communication reception.

The logic for real-time communication request reception receives communication requests, in real time, that arrive from the application logic of each application unit 141 via the shared library 143 containing the real-time communication API. The logic for real-time communication request reception aggregates the received requests and writes transmission frames or the like attached to the requests (such as transmission requests) in a buffer in 110 accordance with the priority of the transmission requests. Requests can thus be made to the real-time communication unit 191 after the communication requests from the application units 141 are organized by their priority. The buffer is located in the shared memory 162 for real-time communication requests. The logic for real-time communication request reception notifies the logic for real-time communication transmission, described below, when a transmission frame is stored. In the buffer inside the shared memory 162 for real-time communication requests.

Upon receiving notification from the logic for real-time communication request reception, the logic for real-time communication transmission retrieves the transmission frame from the buffer inside the shared memory 162 for real-time communication requests and passes the transmission frame to the real-time communication unit 191. Specifically, the logic for real-time communication transmission transmits the transmission frame by writing the transmission frame to a request buffer 197 included in a real-time communication interface 192 the real-time communication unit 191.

Upon receiving a reception notification from a real-time communication notification unit 193 included in the real-time communication unit 191, the logic for real-time communication reception accepts a frame received from an external source and writes the frame in the buffer inside the shared memory 162 for real-time communication requests. The logic for real-time communication reception also notifies the logic for real-time communication request reception of receipt of the frame. Based on the notification from the logic for real-time communication reception, the logic for real-time communication request reception retrieves the received frame from the buffer inside the shared memory 162 for real-time communication requests and returns the received frame to the application unit 141 that issued a reception request.

The shared library 143 containing the real-time communication API is a shared library including an API for the application unit 141 to communicate in real time. The application unit 141 may statically link the functions of the shared library 143 containing the real-time communication API or may dynamically link the functions of the shared library 143 containing the real-time communication API at the time of execution.

The real-time communication unit 191 transmits and receives data in real time based on communication requests from the application units 141. By the nature of the processing executed by the real-time communication unit 191, the timing of transmission and reception of frames and the like needs to be matched to the controller 21 or the PC 22, and real-time responsiveness is required. As used herein, "real-time responsiveness" refers to a communication request from the real-time communication unit 191 to the controller 21 or the PC 22 being completed within a predetermined time or to a response (for example, a report of an error or the like) being returned to the real-time communication unit 191 within a predetermined time when the communication request is not completed within the predetermined time. The "predetermined time" differs by field of application but may, for example, be within a range of several milliseconds to several hundred milliseconds. The task priority of the real-time communication unit 191 is set higher than the task priority of the application units 141. Details of the real-time communication unit 191 are provided below.

The real-time communication unit 191 includes the real-time communication interface 192, the real-time communication notification unit 193, a transmission buffer 194, a self-diagnostic unit 195, and a self-diagnostic index storage 196. The real-time communication interface 192 includes the request buffer 197.

The request buffer 197 at least temporarily accumulates communication requests from the application units 141. The communication requests from the application units 141 are accumulated in the request buffer 197 via the shared library 142 for processing real-time communication requests and the shared library 143 containing the real-time communication API. The communication requests accumulated in the request buffer 197 are retrieved by the real-time communication interface 192 and stored in the transmission buffer 194. The request buffer 197 is fundamentally first in, first out (FIFO), but a communication request may be assigned a higher processing order based on factors such as the priority of the communication request.

The transmission buffer 194 at least temporarily accumulates communication requests from the real-time communication interface 192. The communication requests accumulated in the transmission buffer 194 are transmitted sequentially. The transmission buffer 194 is fundamentally first in, first out (FIFO), but a communication request may be assigned a higher processing order based on factors such as the priority of the communication request.

The real-time communication interface 192 receives communication requests from the application units 141 and provides a response to the communication requests to the application units 141 via the shared library 142 for processing real-time communication requests and the shared library 143 containing the real-time communication API. Specifically, when a communication request is a transmission request, the real-time communication interface 192 executes transmission processing by temporarily accumulating the transmission request from the application unit 141 in the request buffer 197, retrieving the communication request from the request buffer 197, and storing the communication request in the transmission buffer 194. When the real-time communication interface 192 receives notification from the self-diagnostic unit 195, described below, of a possibility of unstable operation, the real-time communication interface 192 waits for a designated time when retrieving the transmission request from the request buffer 197. In other words, the real-time communication interface 192 performs control so that transmission requests accumulated in the request buffer 197 do not excessively flow into the transmission buffer 194. Even if the request buffer 197 receives a large number of transmission requests, the real-time communication interface 192 therefore does not process the transmission requests upon each receipt. This enables the real-time communication interface 192 to reduce the possibility of unstable operation when the real-time communication unit 191 has such a possibility of experiencing unstable operation. The designated time can be determined in advance. The "designated time" differs by field of application but may, for example, be within a range of several milliseconds to several hundred milliseconds.

The self-diagnostic unit 195 detects a diagnostic index related to processing by the real-time communication unit 191 (for example, the CPU usage or processing response time). When the value of the diagnostic index exceeds a predetermined threshold, the self-diagnostic unit 195 judges that the real-time communication unit 191 has a possibility of experiencing unstable operation and notifies the real-time communication interface 192 accordingly. The self-diagnostic unit 195 refers to the self-diagnostic index storage 196 when detecting the diagnostic index.

The self-diagnostic index storage 196 stores a plurality of pairs of the above-described diagnostic index and a threshold for the diagnostic index. For 110 example, the self-diagnostic index storage 196 stores a threshold of the CPU usage of the real-time communication unit 191, a threshold of the processing response time (such as the number of retries for a transmission frame), or another threshold. These thresholds can be set by an external source.

The real-time communication notification unit 193 notifies the shared library 142 for processing real-time communication requests. Specifically, the real-time communication notification unit 193 transmits a time notification to the shared library 142 for processing real-time communication requests over a constant cycle. Processing logic for real-time communication requests in the shared library 142 for processing real-time communication requests is activated upon each time notification and confirms whether processing for transmitting a frame has timed out. The processing for frame transmission times out when a predetermined time elapses without a transmission completion notification being issued to the shared library 142 for processing real-time communication requests by use of a reception notification. For example, this occurs due to an acknowledgement not being returned to the real-time communication unit 191 from the external device that is the recipient of transmission. The real-time communication interface 192 can be instructed to retransmit a frame by the real-time communication notification unit 193 providing a time notification related to transmission timeout. Furthermore, upon receipt of a frame transmitted from an external device to the communication processing apparatus, the real-time communication notification unit 193 provides a receipt notification to the logic for real-time communication request reception and processing logic for real-time communication reception in the shared library 142 for processing real-time communication requests. The processing logic for real-time communication reception in the shared library 142 for processing real-time communication requests can thereby retrieve the received frame.

Figure 2:
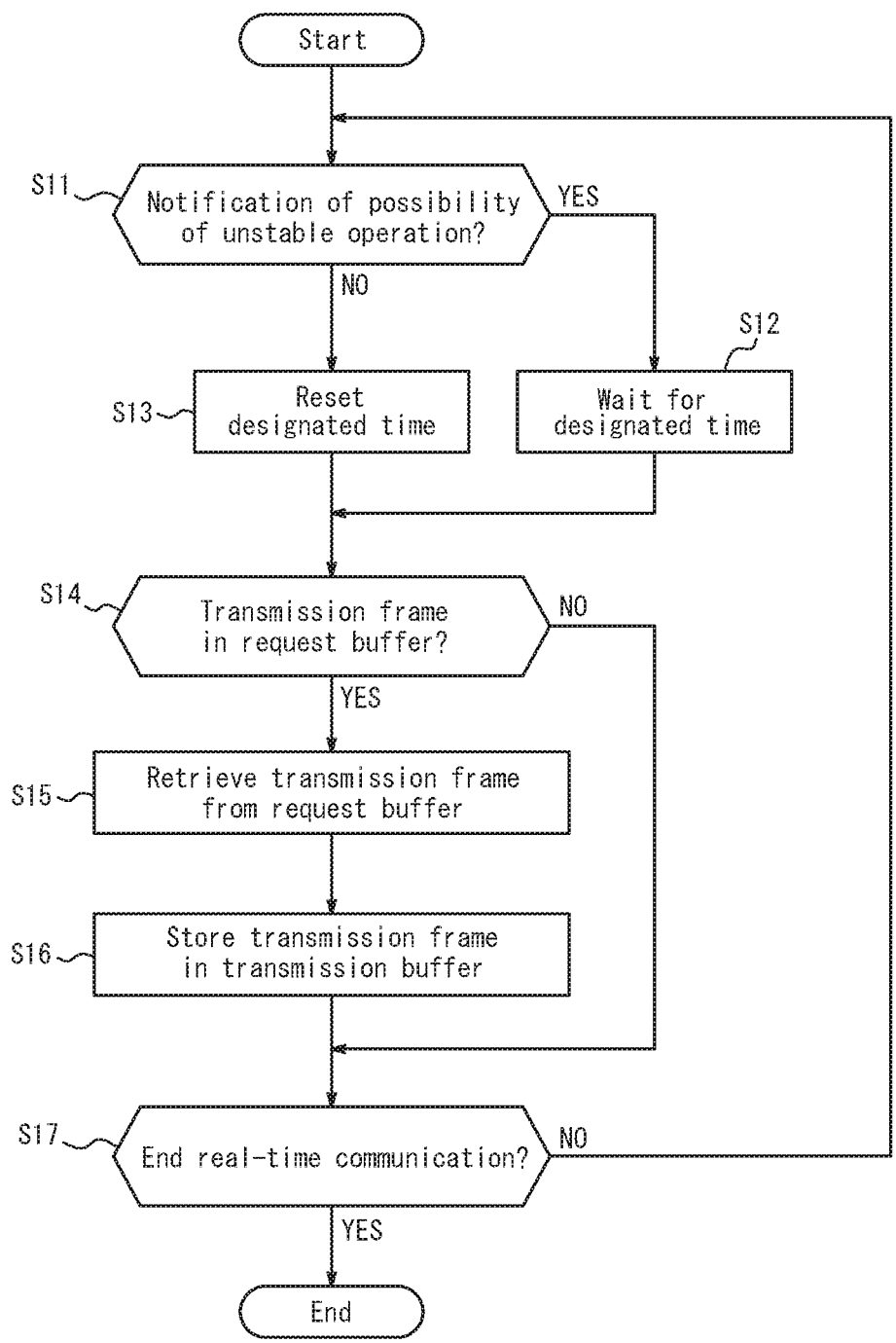
FIG. 2 is a flowchart illustrating processing procedures of a real-time communication interface of FIG. 1.

Next, processing procedures for each function of the communication processing apparatus 4 are described. FIG. 2 is a flowchart illustrating operation procedures of the real-time communication interface 192.

First, in step S11, the real-time communication interface 192 judges whether a notification of the possibility of unstable operation has been received from the self-diagnostic unit 195. When a notification of the possibility of unstable operation has been received (step S11; YES), the processing proceeds to step S12. When a notification of the possibility of 110 unstable operation has not been received (step S11: NO), the processing proceeds to step S13.

In the case of proceeding to step S12, the real-time communication interface 192 waits for the designated time in step S12. The real-time communication interface 192 consequently waits for the designated time before transitioning to step S14. While the real-time communication interface 192 waits in step S12, computational resources are allocated to other processing in the real-time communication unit 191 and to processing of the application units 141. The processing load of real-time communication unit 191 is therefore reduced as compared to when not waiting. After the designated time elapses from when the real-time communication interface 192 starts waiting, computational resources are again allocated to the real-time communication interface 192, and the processing proceeds to step S14. The general-purpose OS scheduler 161 performs the above-described allocation of computational resources.

In the case of proceeding to step S13, the real-time communication interface 192 resets the designated time to an initial value in step S13. The processing proceeds to step S14 after completion of step S13.

Next, in step S14, the real-time communication interface 192 judges whether there is a transmission frame requested by an application unit 141. Specifically, the real-time communication interface 192 refers to the request buffer 197 and judges whether there is a transmission frame. When there is a transmission frame (step S14: YES), the processing proceeds to step S15. When there is no transmission frame (step S14: NO), the processing proceeds to step S17.

In the case of proceeding to step S15, the real-time communication interface 192 retrieves one transmission frame from the request buffer 197 in step S15. When a plurality of transmission frames can be retrieved and transmitted together, however, the real-time communication interface 192 retrieves a predetermined number or less, as determined in advance, of transmission frames from the request buffer 197. The transmission frames in the request buffer 197 are deleted as appropriate after being successfully transferred to the transmission buffer.

Next, in step S16, the real-time communication interface 192 stores the transmission frames retrieved in step S15 in the transmission buffer 194. The transmission frames stored in the transmission buffer 194 are sequentially transmitted by the real-time communication unit 191. Details are provided below with reference to FIG. 3.

Next, in step S17, the real-time communication interface 192 judges whether to end real-time communication. For example, real-time communication is ended when a higher level management function in the communication processing apparatus 4 has instructed to end real-time communication, when an end command has been inputted from an operator or the like, or when it is judged that real-time communication should be ended as a result of analysis of an interrupt caused by an error event or the like. When real-time communication is to be ended (step S17: YES), the processing of the entire flowchart ends. When real-time communication is not to be ended (step S17: NO), the processing returns to step S11, and the above-described processing is repeated.

Figure 3:
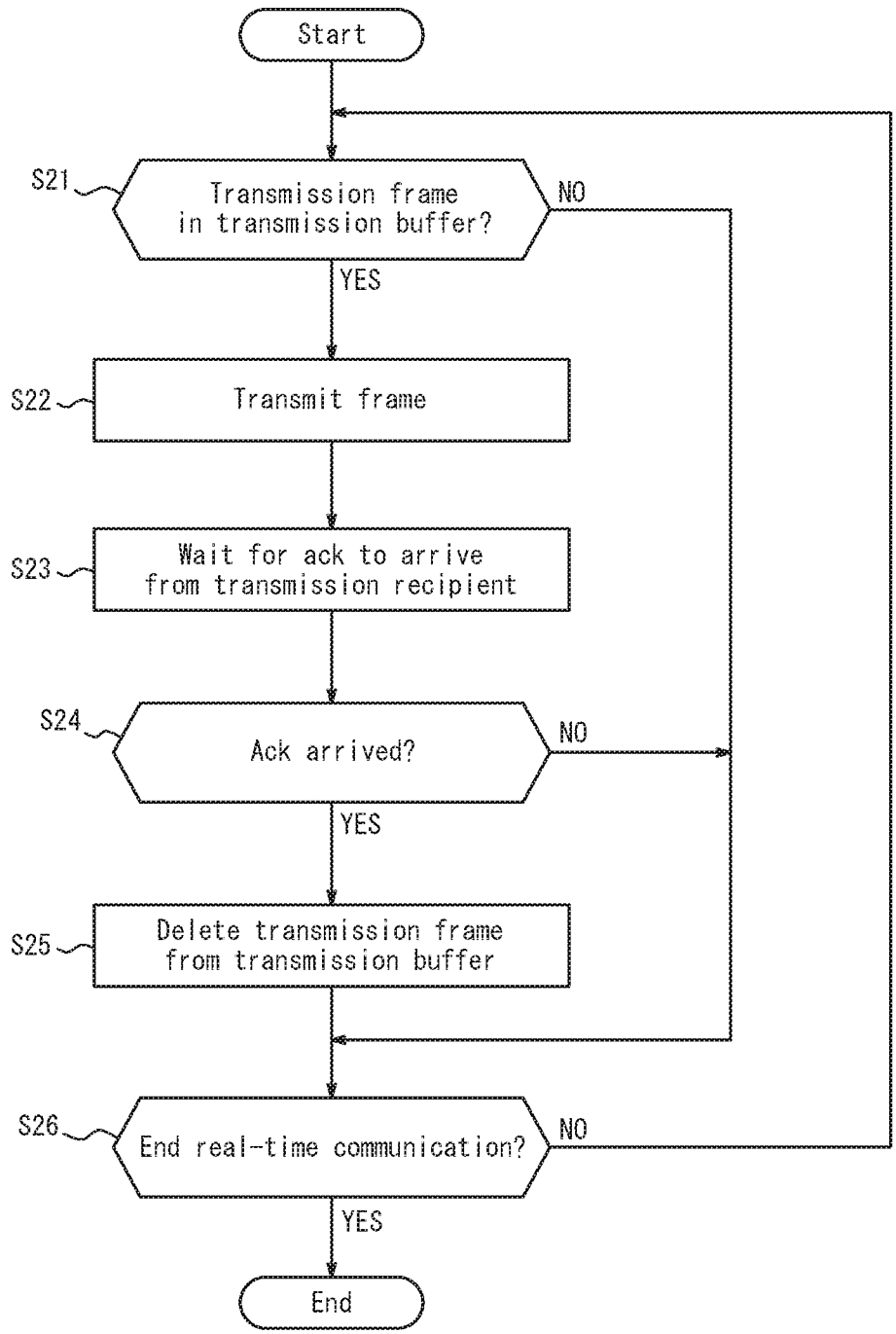
FIG. 3 is a flowchart illustrating processing procedures of a real-time communication unit of FIG. 1.

FIG. 3 is a flowchart illustrating operation procedures of the real-time communication unit 191.

First, in step S21, the real-time communication unit 191 judges whether there is a transmission frame in the transmission buffer 194. When there is a transmission frame (step S21: YES), the processing proceeds to step S22. When there is no transmission frame (step S21: NO), the processing jumps to step S26.

In the case of proceeding to step S22, the real-time communication unit 191 retrieves one transmission frame from the transmission buffer 194 and transmits the frame. When a plurality of transmission frames can be retrieved and transmitted together, however, the real-time communication unit 191 retrieves a predetermined number or less, as determined in advance, of transmission frames from the transmission buffer 194 and transmits the frames.

Subsequently, in step S23, the real-time communication unit 191 waits a predetermined time for the arrival of an acknowledgement (Ack) from the recipient of the frame in step S22 (the receiving end of the frame).

In step S21, the real-time communication unit 191 then judges whether the acknowledgement has arrived. When the acknowledgement has arrived (step S24: YES), i.e. when it is confirmed that the frame was received by the recipient, the processing proceeds to step S25. When the acknowledgement has not arrived (step S24: NO), i.e. when a negative response corresponding to the transmitted frame has arrived, or when the predetermined time has elapsed causing a timeout, the processing jumps to step S26.

In the case of proceeding to step S25, the real-time communication unit 191 deletes the successfully transmitted frame, i.e. the transmission frame for which an acknowledgement was obtained, from the transmission buffer 194 in step S25. When an acknowledgement has not arrived during a certain number of executions of processing, the real-time communication unit 191 may judge that communication with the destination is not possible. In this case, the real-time communication unit 191 may delete the transmission frame from the transmission buffer 194 and cause transmission to fail.

Subsequently, in step S26, the real-time communication unit 191 judges whether to end the processing of the real-time communication unit 191 itself (real-time communication). The conditions for ending the processing of the real-time communication unit 191 are as described with reference to the processing in step S17 of FIG. 2. When real-time communication is to be ended (step S26: YES), the processing of the entire flowchart ends. When real-time communication is not to be ended (step S26: NO), the processing returns to step S21, and the above-described processing is repeated.

In this way, when the possibility of unstable operation exists in the communication processing apparatus 4 according to a comparative example, the real-time communication interface 192 performs control to wait when retrieving a transmission request from the request buffer 197 so that transmission requests accumulated in the request buffer 197 do not excessively flow into the transmission buffer 194. As described below, however, the communication processing apparatus 4 that performs control in this way cannot process the desired amount of data, leading to the problem of a reduction in the processing performance, such as the data transmission amount per unit time, of applications.

In general, the overall processing load in the communication processing apparatus is calculated by Equation (1) below.

$$\text{overall processing load} = \text{(total of processing load of each processor used by process)}/\text{(total of maximum load of all processors)} \quad (1)$$

The following case is described as an example: the total number of processors is two, the maximum load that can be processed on one processor is 100%, the processing loads of the processors are 70% and 50%, and the threshold processing load at which the general-purpose OS scheduler stops processing of a process is 50%. In this case, the overall processing load as calculated by Equation (1) is 60% ((70+50)/(100+100)). Since the overall processing load (60%) exceeds the processing load threshold (50%), real-time responsiveness cannot be ensured. To address this, the communication processing apparatus 4 according to the comparative example reduces the processing load of each processor by waiting, for example, so that the overall processing load does not exceed the processing load threshold. In greater detail, the processing load of each processor after reduction by waiting on the communication processing apparatus 4 according to the comparative example is 40%. The overall processing load as calculated by Equation (1) then becomes 40% ((40+40)/(100+100)), which is smaller than the processing load threshold (50%). The actual total processing load of the processors being used by the process, however, is reduced from 120% (70%+50%) to 80% (40%+40%). Therefore, the communication processing apparatus 4 according to the comparative example cannot process the desired amount of data, leading to the problem of a reduction in the processing performance, such as the data transmission amount per unit time, of applications.

This problem could be addressed as follows. When a PC is virtualized, and the processing load exceeds a predetermined threshold, a virtual processor could be added to ensure real-time responsiveness while maintaining the processing performance of application software. In the above-described example, the addition of one virtual processor changes the overall processing load of the virtual machine as follows.

$$\text{overall processing load of virtual machine} = (70+50)/(100+100+100)$$
$$= 120/300$$
$$= 40\%$$

In other words, the addition of a virtual processor can reduce the relative processing load of the virtual machine to 40% while maintaining the total processing load of processors used by the process at 120% (70%+50%). Real-time responsiveness can therefore be ensured while the processing capability of the application is maintained. If a virtual processor is simply added, however, without taking into consideration the importance of the application in a production control system, the problem of decreased processing performance of applications remains, since it may be impossible to add a virtual processor in cases such as when all of the virtual processors have already been allocated.

The present disclosure describes a communication processing apparatus capable of ensuring the real-time responsiveness necessary for a production control system while using a general-purpose OS scheduler. Additionally, the present disclosure describes a communication processing apparatus that takes into consideration the effect on the production control system overall and is thereby capable of ensuring real-time responsiveness without reducing the amount of processing by a real-time communication unit, even when no virtual processor is free.

Figure 4:
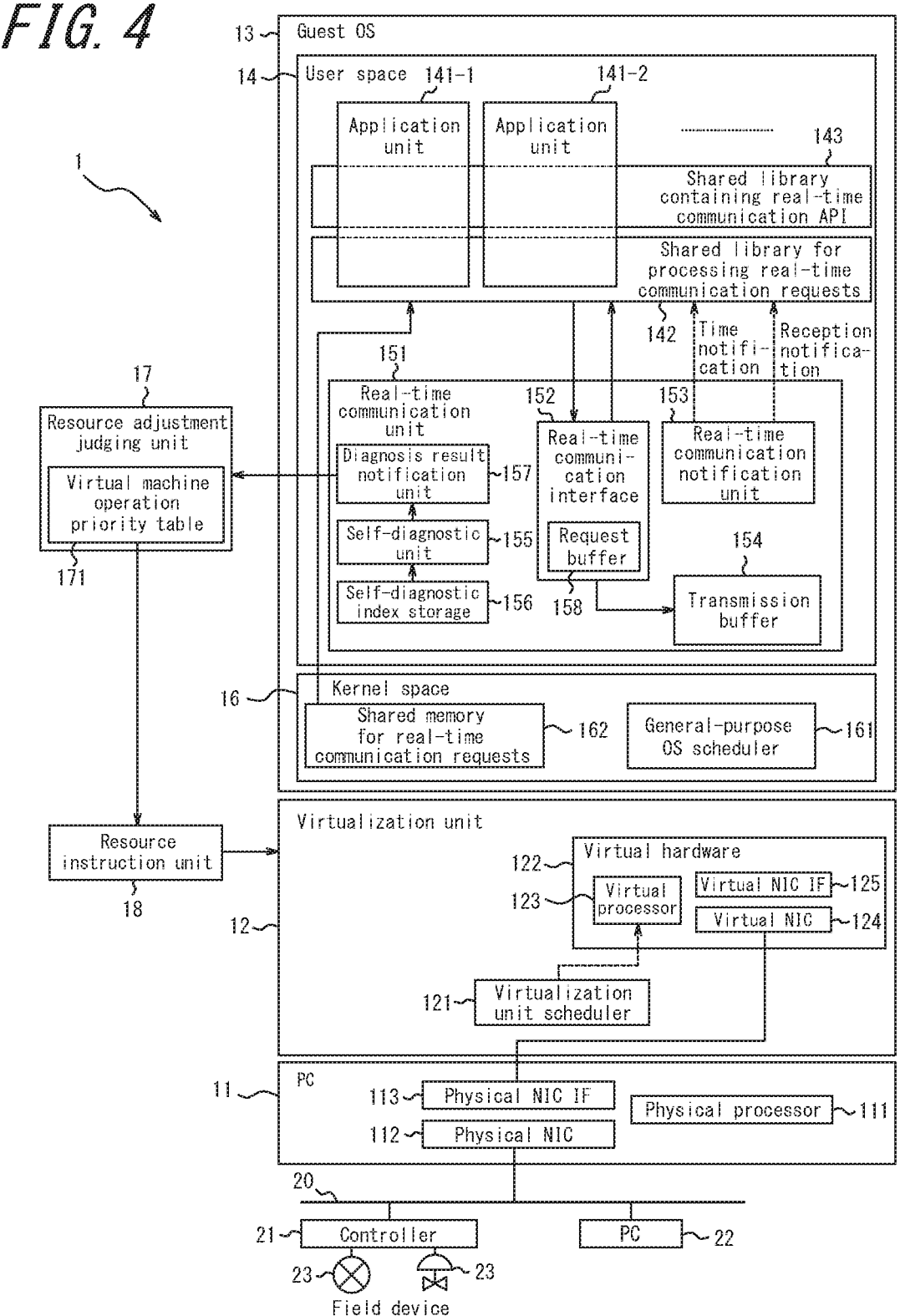
FIG. 4 is a functional block diagram illustrating the configuration of a communication processing apparatus according to a first embodiment.

A communication processing apparatus, in a production control system, according to a first embodiment of the present disclosure is described below. FIG. 4 is a functional block diagram illustrating the functional configuration of a communication processing apparatus 1 according to the present embodiment.

The communication processing apparatus 1 is configured on a PC 11 (physical PC), which is hardware. The PC 11 is virtualized. In other words, the PC 11 includes a virtualization unit 12, a host OS operates on the PC 11, and virtual machines operate on the host OS. A general-purpose OS can be used as the host OS. Examples of a general-purpose OS include a Windows® family OS, released by Microsoft Corporation (USA) as an OS for PCs.

The PC 11 includes a physical processor 111, a physical NIC 112, and a physical NIC IF 113. The PC 11 may include other constituent elements, such as memory. The PC 11 is connected to a control network 20 via the physical NIC 112. Devices such as a controller 21 and a PC 22 are connected to the control network 20, and a plurality of field devices 23 are connected to the controller 21. The physical processor 111, the physical NIC 112, the physical NIC IF 113, the control network 20, the controller 21, the PC 22, and the field devices 23 are respectively similar to the physical processor 111, the physical NIC 112, the physical NIC IF 113, the control network 20, the controller 21, the PC 22, and the field devices 23 described in the comparative example.

The virtualization unit 12 includes a virtualization unit scheduler 121 and virtual hardware 122 and controls operations of one or more virtual machines implemented with a virtualization technique. While details are provided below, the virtualization unit 12 changes virtual resources by executing a command received from a resource instruction unit 18. Addition of a virtual processor 123 to a virtual machine, deletion of the virtual processor 123 from a virtual machine, and suspension or restarting of a virtual machine are examples of "changing virtual resources". Virtual resources may be changed while a virtual machine is operating. In this case, the change in virtual resources is reflected during operation of the virtual machine on a guest OS 13 operating on the virtual machine.

The virtualization unit scheduler 121 appropriately allocates a physical processor 111 and a virtual processor 123 in one-to-one correspondence. Accordingly, a virtual processor 123 being free means that a physical processor 111 included in a PC 11 is free, or that a virtual processor 123 included in the virtual hardware 122 is free. For example, the virtualization unit scheduler 121 associates a core included in the physical CPU with a virtual CPU core in one-to-one correspondence. The physical CPU may include any number of cores, such as a plurality of cores.

The virtual hardware 122 is virtual computer hardware implemented by the virtualization unit 12. The virtual hardware 122 includes the virtual processor 123, a virtual NIC 124, and a virtual NIC IF 125. The virtual hardware 122 may include a virtual memory.

The virtual processor 123 is a virtual processor implemented by the virtualization unit 12. The virtualization unit scheduler 121 appropriately allocates a physical processor 111 to the task of the virtualization unit 12. The program allocated to the virtual processor 123 thereby operates.

The NIC 124 is a virtual network interface card. In other words, a communication request from the guest OS 13 to the virtual NIC 124 is continued on the physical NIC 112.

The virtual NIC IF 125 is a virtual interface for accessing the virtual NIC 124 from the guest OS 13.

The guest OS 13 operates on each virtual machine. Only one guest OS 13 is illustrated in FIG. 4, but a plurality of guest OSs 13 may operate on the PC 11. Each guest OS 13 includes a user space 14 and a kernel space 16. A general-purpose OS can be used as the guest OS 13. Examples of a general-purpose OS include a Windows® family OS, released by Microsoft Corporation (USA) as an OS for PCs.

A general-purpose OS scheduler 161 and a shared memory 162 for real-time communication requests are located in the kernel space 16. A shared memory for tasks operating in the user space 14 may also be located in the kernel space 16. The general-purpose OS scheduler 161, the shared memory 162 for real-time communication requests, and the shared memory are similar to the general-purpose OS scheduler 161, the shared memory 162 for real-time communication requests, and the shared memory described in the comparative example.

Application units 141-1, 141-2, . . . (application units 141), a shared library 142 for processing real-time communication requests, a shared library 143 containing a real-time communication API, and a real-time communication unit 151 are located in the user space 14. Apart from operating on the guest OS 13, the application units 141, the shared library 142 for processing real-time communication requests, and the shared library 143 containing the real-time communication API are similar to the application units 141, the shared library 142 for processing real-time communication requests, and the shared library 143 containing the real-time communication API described in the comparative example.

The real-time communication unit 151 communicates in real time based on communication requests from the application units 141. Specifically, the real-time communication unit 151 receives communication requests from the application units 141 and transmits and receives data based on the communication requests. By the nature of the processing executed by the real-time communication unit 151, the timing of transmission and reception of frames and the like needs to be matched to the controller 21 or the PC 22, and real-time responsiveness is required. The real-time communication unit 151 also preferably operates as a task independent from the application units 141. Communication by the real-time communication unit 151 with other devices is thereby performed without delay. Here, the real-time communication unit 151 detects a diagnostic index related to communication processing and notifies a resource adjustment judging unit 17 of the possibility of unstable operation when the value of the diagnostic index exceeds a predetermined threshold. Details of the real-time communication unit 151 according to the present embodiment are provided below.

The real-time communication unit 151 includes a real-time communication interface 152, a real-time communication notification unit 153, a transmission buffer 154, a self-diagnostic unit 155, a self-diagnostic index storage 156, and a diagnosis result notification unit 157. The real-time communication interface 152 includes a request buffer 158.

The real-time communication interface 152 has the functions of receiving requests from the application units 141 and providing a response to the requests to the application units 141 via the shared library 142 for processing real-time communication requests and the shared library 143 containing the real-time communication API. When the received communication request is a data transmission request, the real-time communication interface 152 retrieves the transmission request from the request buffer 158 and executes transmission processing.

The self-diagnostic unit 155 detects a diagnostic index related to processing of the real-time communication unit 151 and judges whether the detected value of the diagnostic index exceeds a predetermined threshold. When the detected value of the diagnostic index exceeds a predetermined threshold, the self-diagnostic unit 155 judges that unstable operation might occur on the virtual machine on which the real-time communication unit 151 exhibiting the diagnostic index operates. The self-diagnostic unit 155 then notifies the diagnosis result notification unit 157 of the possibility of unstable operation. The self-diagnostic unit 155 can refer to the self-diagnostic index storage 156 when detecting the diagnostic index. The self-diagnostic index storage 156 is similar to the self-diagnostic index storage 196 described in the comparative example.

Examples of the diagnostic index detected by the self-diagnostic unit 155 include (1) CPU load (CPU usage) and (2) responsiveness (response time), described below, but these examples are not limiting.

(1) CPU load: the self-diagnostic unit 155 acquires the value of the CPU usage by the real-time communication unit 151 from the guest OS 13. The guest OS 13 includes an interface for a program to acquire performance data in the guest OS 13. The value of the CPU usage of each task is included in the performance data. When the CPU usage of the real-time communication unit 151 exceeds a predetermined threshold, the self-diagnostic unit 155 judges that unstable operation might occur. The self-diagnostic unit 155 may be configured to detect the possibility of unstable operation based on another diagnostic index. For example, the self-diagnostic unit 155 may acquire information such as the overall CPU usage of the guest OS 13 and the number of virtual processors 123 allocated to the virtual hardware 122 on which the guest OS 13 operates. The self-diagnostic unit 155 can judge that unstable operation might occur when the result of judgment by combining a plurality of these values exceeds a predetermined threshold (for example, 30% CPU usage when the number of virtual processors (more specifically, the number of virtual CPU cores) is four, 15% CPU usage when the number of virtual processors (more specifically, the number of virtual CPU cores) is eight, etc.).

(2) Responsiveness: the self-diagnostic unit 155 judges that unstable operation might occur when the responsiveness of real-time communication unit 151 has diminished. Specifically, the self-diagnostic unit 155 acquires the number of retries that occur when the real-time communication unit 151 transmits a frame. A transmission retry occurs when the real-time communication unit 151 has to wait for processing. When retries are frequent, the real-time responsiveness of communication can be considered to be impaired. Accordingly, when the number of retries occurring for one frame exceeds a predetermined threshold, or when the total number of transmission retries during a predetermined time exceeds a predetermined threshold, the self-diagnostic unit 155 can judge that unstable operation might occur.

The diagnosis result notification unit 157 provides the resource adjustment judging unit 17, described below, with the notification received from the self-diagnostic unit 155. The self-diagnostic unit 155 may, however, notify the resource adjustment judging unit 17 of the above-described possibility of unstable operation without going through the diagnosis result notification unit 157.

Figure 5:
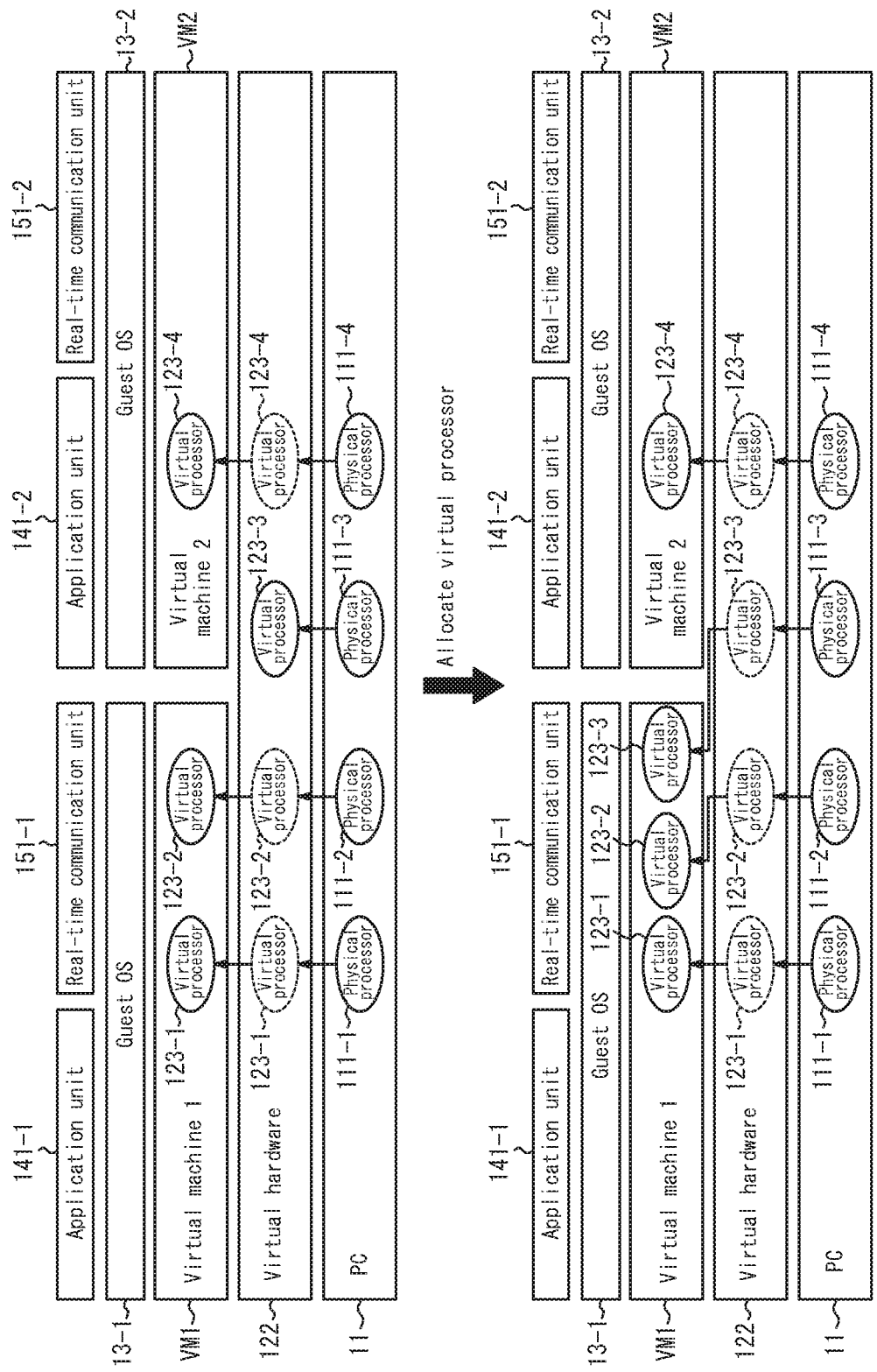
FIG. 5 illustrates allocation of virtual processors of FIG. 4.

When receiving the notification from the diagnosis result notification unit 157, the resource adjustment judging unit 17 judges whether a virtual processor 123 is free. When a virtual processor 123 is free, the resource adjustment judging unit 17 instructs the resource instruction unit 18 to add the virtual processor 123 to the virtual machine that has a possibility of experiencing unstable operation. For example, FIG. 5 illustrates the case of two virtual machines VM1, VM2 respectively operating on guest OSs 13-1, 13-2. The virtual machine VMI has a possibility of experiencing unstable operation. In this case, the virtual processor 123-3 included in the virtual hardware 122 is free. The resource adjustment judging unit 17 therefore instructs the resource instruction unit 18 to allocate (add) the virtual processor 123-3 to the virtual machine VM1. On the other hand, when no virtual processor 123 is free, the resource adjustment judging unit 17 judges whether there is a virtual machine with low operation priority. When there is a virtual machine with low operation priority, the resource adjustment judging unit 17 instructs the resource instruction unit 18 to suspend the virtual machine with low operation priority, to delete the virtual processor 123 of the suspended virtual machine, and to add the deleted virtual processor 123 to the virtual machine that has a possibility of experiencing unstable operation. In other words, when no virtual processor 123 is free, the resource adjustment judging unit 17 instructs the virtualization unit 12, described below, to add the virtual processor 123, which was allocated to the virtual machine with low operation priority, to the virtual machine that has the possibility of experiencing unstable operation. In making these judgments, the resource adjustment judging unit 17 can collect information of the virtual machine that has a possibility of experiencing unstable operation, information of different virtual machines from this virtual machine, information of applications operating on each virtual machine, information of virtual hardware, information of the PC, and the like. In judging whether there is a virtual machine with low priority, the resource adjustment judging unit 17 can refer to a virtual machine operation priority table 171, described next. The "virtual machine with a low operation priority" is a virtual machine with an operation priority equal to or less than a predetermined value. In other words, the virtual machine with a low operation priority refers to a virtual machine, among the virtual machines operating on the PC 11, that has little effect on the production control system when the virtual machine is suspended.

Referring to FIG. 6, an example of the virtual machine operation priority table 171 illustrated in FIG. 4 is described. The virtual machine operation priority table 171 includes a virtual machine ID and an operation priority. The information listed in the "operating application" and the "notes" columns of FIG. 6 is merely included for illustration and need not be included in the actual virtual machine operation priority table 171. The virtual machine ID (VM1, VM2, VM3, VM4) is an ID for identifying each virtual machine and is attached to each virtual machine. When the symbol "*" is attached to the virtual machine ID column, the resource adjustment judging unit 17 acquires information of the application operating on the virtual machine corresponding to the virtual machine with a "*" attached and designates all of the virtual machines on which the corresponding application is operating as targets for suspension. Operation of a virtual machine needs to be more highly prioritized as the value of the operation priority is higher. The operation priority can be set in advance as follows, for example. The operation priority is set high (operation priority: 1) for a virtual machine (VM1) when the virtual machine is running an application that has a server function, such as a data server, and suspension of the function would greatly affect the production control system. When a certain application is only operating on one virtual machine (VM2), the operation priority of the virtual machine (VM2) is set high (operation priority: 2). On the other hand, when the same application is operating on two virtual machines (VM3, VM4), the operation priority of one virtual machine (VM4) is set lower (operation priority: 3) than the operation priority (operation priority: 1) of the other virtual machine (VM3). If one of the virtual machines (VM4) is suspended, this enables the application to operate on the other virtual machine (VM3). The operation priority is set low for a virtual machine on which a client function is operating, such as an HMI, since suspension of one virtual machine would have little effect on the production control system. When the operating cycle of an application is long (for example, one operation cycle per week), the operation priority of the virtual machine on which the application operates is set low. The virtual machine operation priority table 171 may he stored in advance in memory inside the resource adjustment judging unit 17, but this example is not limiting.

The resource adjustment judging unit 17 operates on a network management service (NMS) on a different PC than the PC 11 that communicates in real time. The NMS in particular supervises the operation conditions of virtual machines of the control system overall, the PC 11 on which the virtual machines operate, the network 20, the controller 21, and the like. To prioritize responsiveness, the resource adjustment judging unit 17 may operate on the virtualization unit 12, on the guest OS 13 that communicates in real time, or on a guest OS that does not communicate in real time.

The resource instruction unit 18 transmits a command based on the instruction received from the resource adjustment judging unit 17 to the virtualization unit 12. The virtualization unit 12 can thereby execute the command. In the present embodiment, the resource instruction unit 18 operates on the PC 11 that communicates in real time, but this example is not limiting. The above-described command may be transmitted remotely over a network, for example. In this case, the resource instruction unit 18 can operate on a different PC than the PC 11 that communicates in real time.

The real-time communication notification unit 153, the transmission buffer 154, and the request buffer 158 are respectively the same as the real-time communication notification unit 193, the transmission buffer 194, and the request buffer 197 described in the comparative example.

Figure 7:
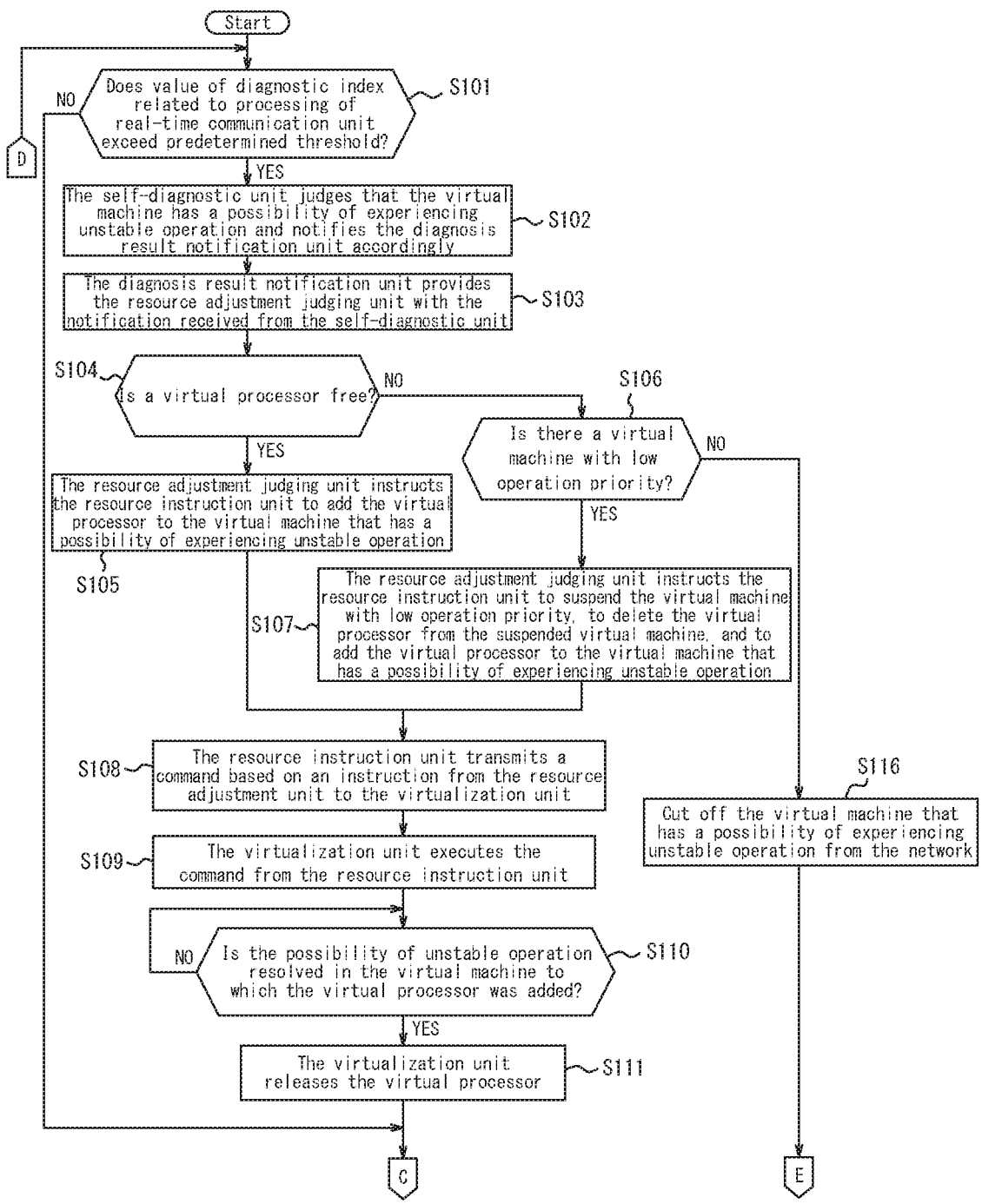
FIG. 7 is a flowchart illustrating processing procedures of the communication processing apparatus of FIG. 4.
Figure 8:
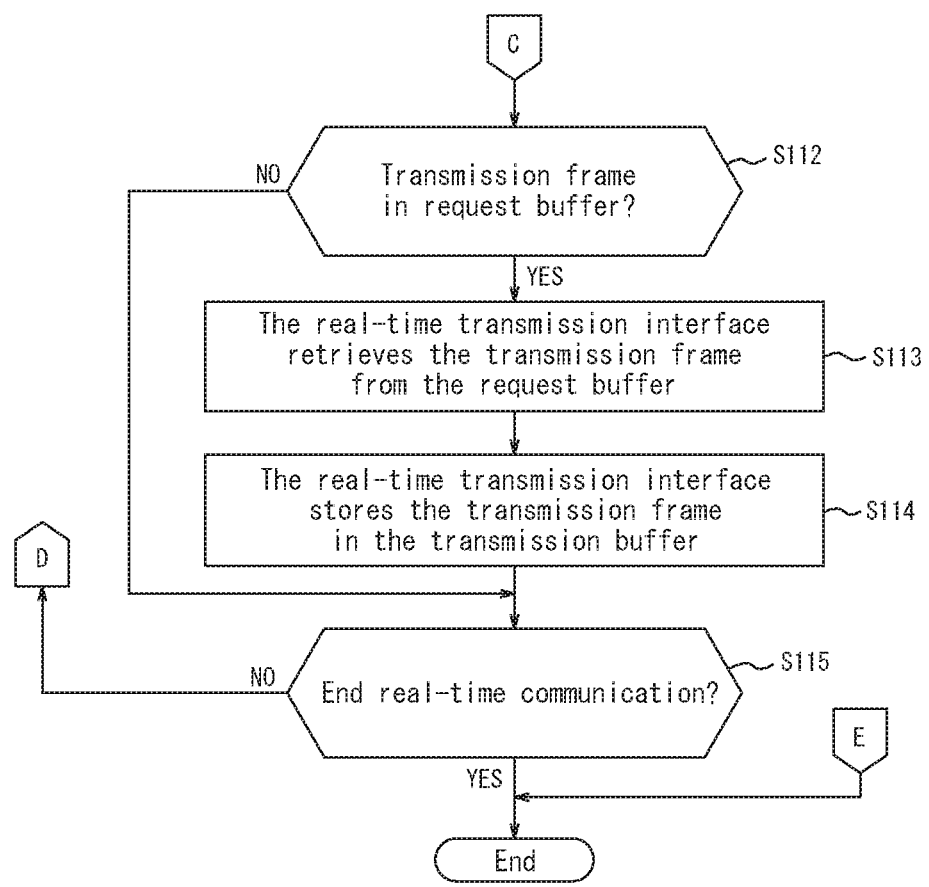
FIG. 8 is a flowchart illustrating processing procedures of the communication processing apparatus of FIG. 4.

Next, processing procedures for each function of the communication processing apparatus 1 according to the present embodiment are described, FIGS. 7 and 8 are flowcharts illustrating the processing procedures of the real-time communication unit 151, the resource adjustment judging unit 17, the resource instruction unit 18, and the virtualization unit 12 in the present embodiment.

First, in step S101, the self-diagnostic unit 155 detects a diagnostic index related to processing of the real-time communication unit 151 and judges whether the value of the diagnostic index exceeds a predetermined threshold. When the value of the diagnostic index exceeds a predetermined threshold (step S101: YES), the processing proceeds to step S102. When the value of the diagnostic index does not exceed a predetermined threshold (step S101: NO), the processing jumps to step S112 of FIG. 8.

In the case of proceeding to step S102, the self-diagnostic unit 155 judges in step S102 that unstable operation might occur on the virtual machine on which the real-time communication unit 151 exhibiting the diagnostic index of step S101 operates. The self-diagnostic unit 155 notifies the diagnosis result notification unit 157 accordingly.

Subsequently, in step S103, the diagnosis result notification unit 157 provides the resource adjustment judging unit 17 with the notification received from the self-diagnostic unit 155. The self-diagnostic unit 155 may, however, notify the resource adjustment judging unit 17 of the above-described possibility of unstable operation without going through the diagnosis result notification unit 157.

Next, in step S104, the resource adjustment judging unit 17 judges whether a virtual processor 123 is free. For example, the resource adjustment judging unit 17 can collect information from the virtual hardware 122 or the PC 11 and make the judgment based on the collected information. When a virtual processor 123 is free (step S104: YES), the processing proceeds to step S105. When no virtual processor 123 is free (step S104: NO), the processing proceeds to step S106.

In the case of proceeding to step S105, i.e. when a virtual processor 123 is free, the resource adjustment judging unit 17 instructs the resource instruction unit 18 in step S105 to add the virtual processor 123 to the virtual machine that has a possibility of experiencing unstable operation. The processing then proceeds to step S108.

In the case of proceeding to step S106, i.e. when no virtual processor 123 is free, the resource adjustment judging unit 17 judges whether there is a virtual machine with low operation priority. For example, the resource adjustment judging unit 17 can collect information of the virtual machine that has a possibility of experiencing unstable operation, information of different virtual machines from this virtual machine, and information of applications operating on each virtual machine. The resource adjustment judging unit 17 can then make the judgment based on the collected information. Specifically, the resource adjustment judging unit 17 can appropriately refer to the virtual machine operation priority table illustrated in FIG. 6 and make the judgment. When there is a virtual machine with a low operation priority (step S106: YES), the processing proceeds to step S107. When there is no virtual machine with a low operation priority (step S106: NO), the processing proceeds to step S116.

In the case of proceeding to step S107, i.e. when there is a virtual machine with low operation priority, the resource adjustment judging unit 17 instructs the resource instruction unit 18 in step S107 to suspend the virtual machine with low operation priority, to delete the virtual processor 123 allocated to the suspended virtual machine, and to add the deleted virtual processor 123 to the virtual machine that has a possibility of experiencing unstable operation. The resource adjustment judging unit 17 may issue these instructions to the resource instruction unit 18 sequentially instead of simultaneously.

Subsequently, in step S108, the resource instruction unit 18 transmits a command based on the instruction received from the resource adjustment judging unit 17 to the virtualization unit 12. In other words, in the case of proceeding to step S108 from step S105, this command includes a command to add the virtual processor 123 to the virtual machine that has a possibility of experiencing unstable operation. In the case of proceeding to step S108 from step S107, however, this command includes a command to suspend the virtual machine with a low operation priority, a command to delete the virtual processor 123 of the suspended virtual machine, and a command to add the deleted virtual processor 123 to the virtual machine that has a possibility of experiencing unstable operation.

Subsequently, in step S109, the virtualization unit 12 executes the command received from the resource instruction unit 18.

Subsequently, in step S110, the self-diagnostic unit 155 judges whether the possibility of unstable operation has been resolved in the virtual machine to which the virtual processor 123 was added. This judgment may be made with the same method as in step S101. When the possibility of unstable operation has been resolved (step S110: YES), the processing proceeds to step S111. When the possibility of unstable operation has not been resolved (step S110: NO), the self-diagnostic unit 155 waits for a predetermined designated time and then executes the processing of step S110 again.

Subsequently, in step S111, the virtualization unit 12 releases the added virtual processor 123. The released virtual processor 123 may, for example, be allocated to a virtual machine that has a possibility of experiencing unstable operation, as in the above-described processing.

Subsequently, referring to FIG. 8, the real-time communication interface 152 judges in step S112 whether there is a transmission frame requested by the application unit 141. For example, the real-time communication interface 152 can refer to the request buffer 158 and judge whether there is a transmission frame. When there is a transmission frame (step S112: YES), the processing proceeds to step S113. When there is no transmission frame (step S112: NO), the processing jumps to step S115.

In the case of proceeding to step S113, the real-time communication interface 152 retrieves one transmission frame from the request buffer 158 in step S113. When a plurality of transmission frames can be retrieved and transmitted together, however, the real-time communication interface 152 may retrieve a predetermined number or less, as determined in advance, of transmission frames from the request buffer 158. The transmission frames in the request buffer 158 can be deleted as appropriate after being successfully transferred to the transmission buffer 154.

Subsequently, in step S114, the real-time communication interface 152 stores the transmission frames retrieved in step S113 in the transmission buffer 154. The transmission frames stored in the transmission buffer 154 are sequentially transmitted by the real-time communication unit 151, as in the comparative example illustrated in FIG. 3, for example.

Next, in step S115, the real-time communication interface 152 judges whether to end real-time communication in the real-time communication unit 151. For example, real-time communication is ended when a higher level management function in the communication processing apparatus 1 has instructed to end real-time communication, when an end command has been inputted from an operator or the like, or when it is judged that real-time communication should be ended as a result of analysis of an interrupt caused by an error event or the like. When real-time communication is to be ended (step S115: YES), the processing of the flowchart ends. When real-time communication is not to be ended (step S115: NO), the processing returns to step S101 of FIG. 7, and the above-described processing is repeated.

In the case of proceeding from step S106 to step S116 of FIG. 7, i.e. when there is no virtual machine with low operation priority, the virtual machine that has a possibility of experiencing unstable operation is cut off from the network of the production control system, and the processing of the present flowchart ends. Specifically, the virtual NIC 124 corresponding to the virtual machine that has a possibility of experiencing unstable operation is disabled via the resource instruction unit 18, thereby cutting off the virtual machine from the network and ending the processing of the present flowchart.

The following effects are obtained with the present embodiment. When the processing load of the real-time communication unit becomes large, leading to the possibility of unstable operation on a virtual machine, a virtual processor is added to the virtual machine in the present embodiment. Real-time responsiveness can thereby be ensured without reducing the processing amount of the real-time communication unit. Furthermore, the effect on the production control system overall is taken into consideration, thereby ensuring real-time responsiveness without reducing the amount of processing by the real-time communication unit, even when no virtual processor is free to be added to the virtual machine.

Second Embodiment

Next, a second embodiment of the present disclosure is described. The matter unique to the present embodiment is described, whereas a description of matter already described in the first embodiment is omitted.

Figure 9:
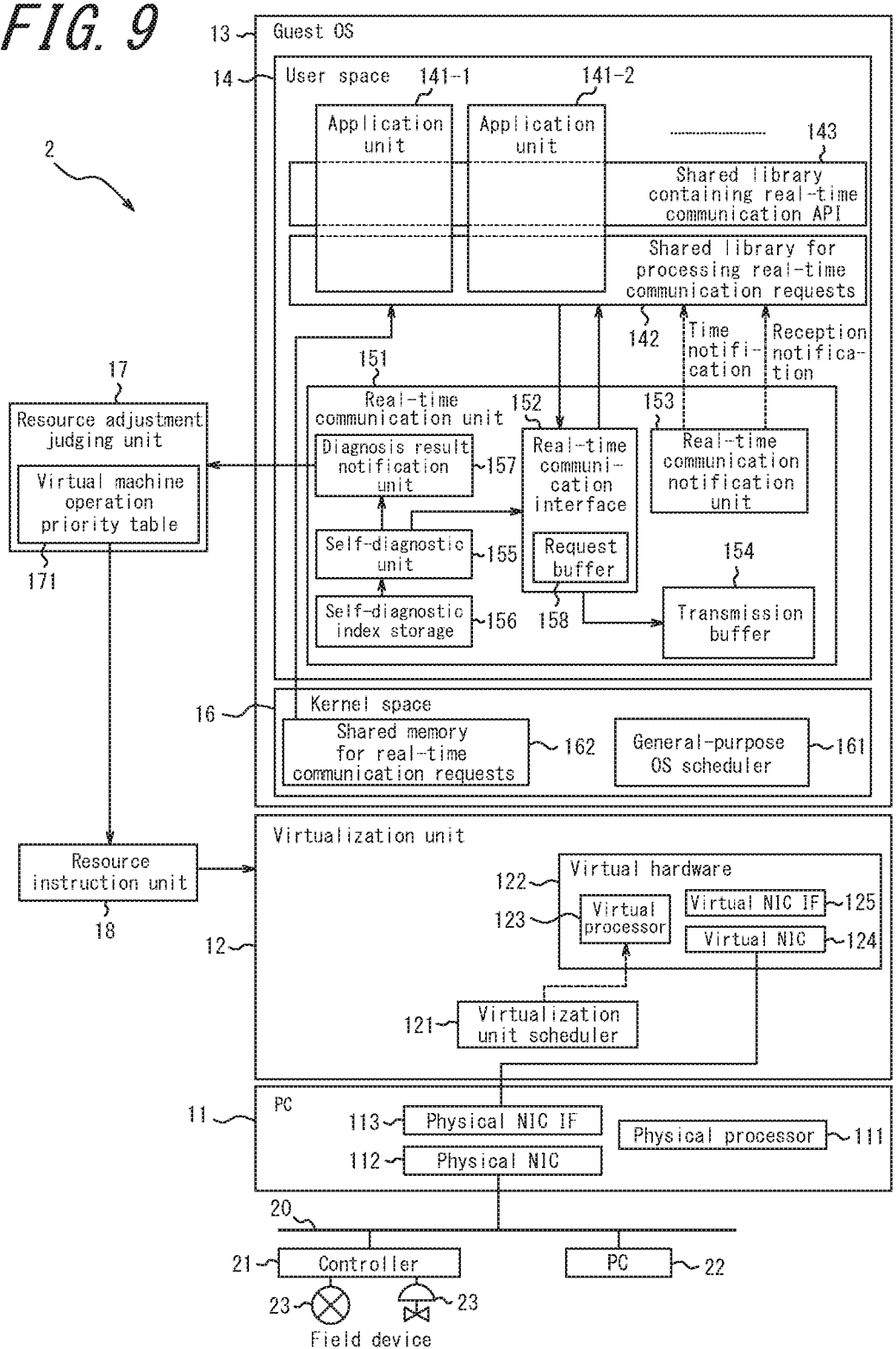
FIG. 9 is a functional block diagram illustrating the configuration of a communication processing apparatus according to a second embodiment.

FIG. 9 is a functional block diagram illustrating the functional configuration of a communication processing apparatus 2 in a production control system according to the second embodiment. The self-diagnostic unit 155 of the present embodiment differs from that of the first embodiment in that the recipient of notification by the self-diagnostic unit 155 changes in accordance with the value of the diagnostic index detected by the self-diagnostic unit 155. Specifically, when the value of the diagnostic index detected by the self-diagnostic unit 155 exceeds a first threshold, the self-diagnostic unit 155 in the second embodiment judges that a virtual machine may have a possibility of experiencing unstable operation and notifies the diagnosis result notification unit 157 accordingly. When the value of the diagnostic index detected by the self-diagnostic unit 155 exceeds a second threshold, the self-diagnostic unit 155 judges that a virtual machine may have a possibility of experiencing unstable operation and notifies the real-time communication interface 152 accordingly. In other words, the real-time communication unit 151 of the present embodiment notifies the resource adjustment judging unit 17 of the possibility of unstable operation when the value of the diagnostic index exceeds the first threshold. The real-time communication unit 151 adjusts the time interval for processing communication requests from the application unit 141 when the value of the diagnostic index exceeds the second threshold. The first threshold is set lower than the second threshold. Accordingly, when the value of the diagnostic index exceeds the first threshold but does not exceed second threshold, the real-time communication unit 151 performs normal real-time communication processing without adjusting the time interval. The second threshold is set smaller than the threshold on the processing load of the general-purpose OS scheduler 161. The "threshold on the processing load of the general-purpose OS scheduler" refers to a reference value used when the general-purpose OS scheduler forcibly allocates computational resources from a high priority task to a low priority task.

Figure 10:
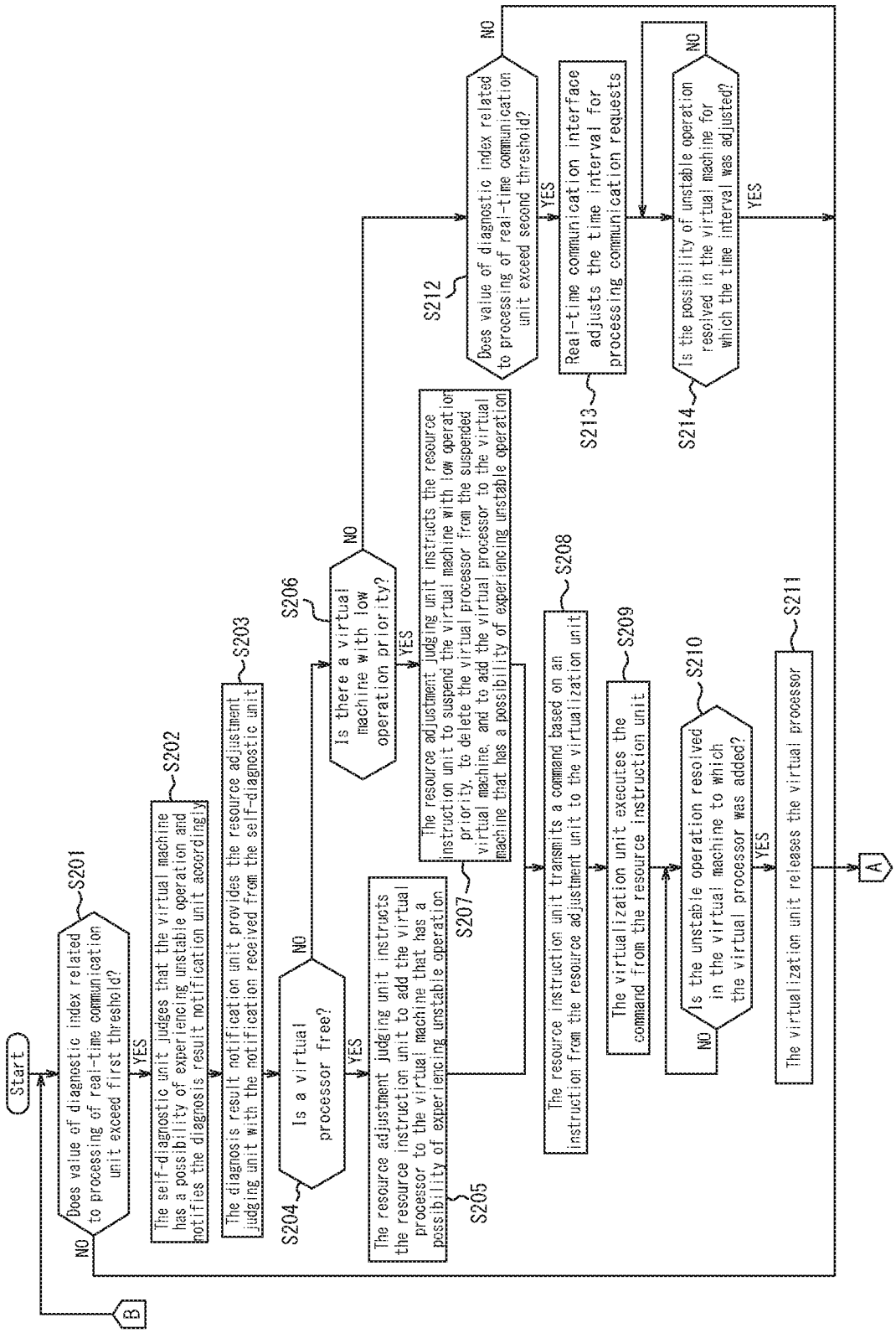
FIG. 10 is a flowchart illustrating processing procedures of the communication processing apparatus of FIG. 9.
Figure 11:
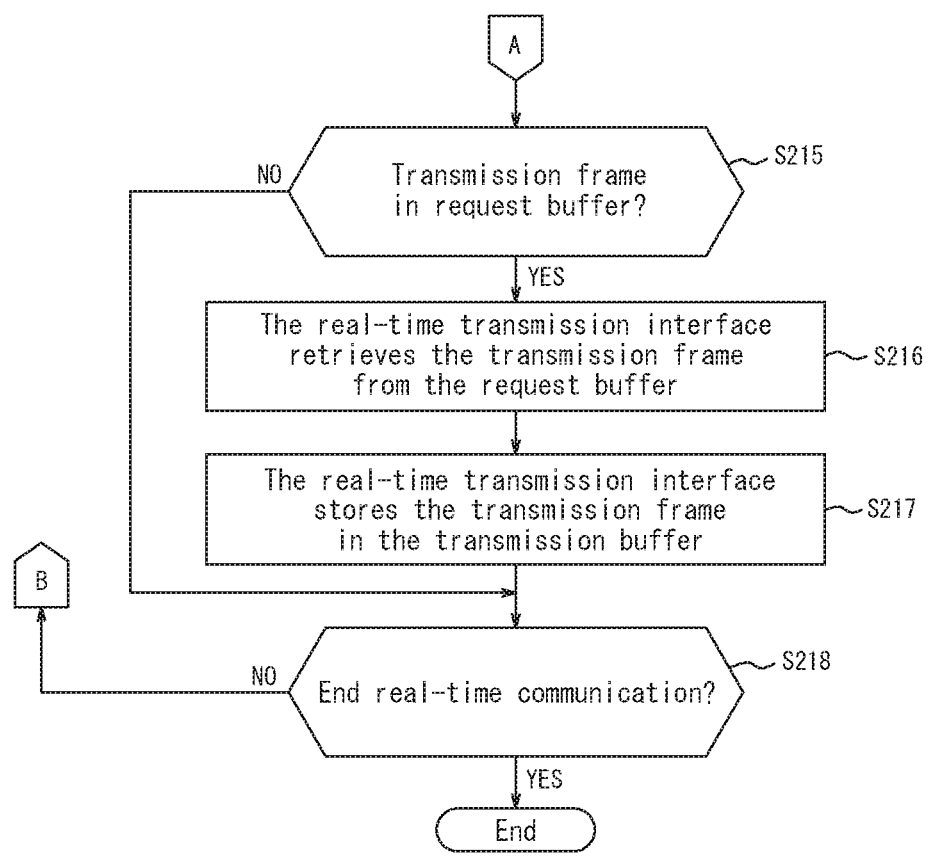
FIG. 11 is a flowchart illustrating processing procedures of the communication processing apparatus of FIG. 9.

Next, processing procedures for each function of the communication processing apparatus 2 according to the present embodiment are described. FIGS. 10 and 11 are flowcharts illustrating the processing procedures of the real-time communication unit 151, the resource adjustment judging unit 17, the resource instruction unit 18, and the virtualization unit 12 in the present embodiment.

First, in step S201, the self-diagnostic unit 155 detects a diagnostic index related to processing of the real-time communication unit 151 and judges whether the detected value of the diagnostic index exceeds a first threshold. When the value of the diagnostic index exceeds the first threshold (step S201: YES), the processing proceeds to step S202. When the value of the diagnostic index does not exceed the first threshold (step S201: NO), the processing jumps to step S215 of FIG. 11.

In the case of proceeding to step S202, the self-diagnostic unit 155 judges in step S202 that the virtual machine has a possibility of experiencing unstable operation and notifies the diagnosis result notification unit 157 accordingly.

Subsequently, in step S203, the diagnosis result notification unit 157 provides the resource adjustment judging unit 17 with the notification received from the self-diagnostic unit 155.

Next, in step S201, the resource adjustment judging unit 17 judges whether a virtual processor 123 is free. When a virtual processor 123 is free (step S204: YES), the processing proceeds to step S205. When no virtual processor 123 is free (step S204: NO), the processing proceeds to step S206. The processing in step S204 is similar to the processing in step S104 in the first embodiment.

In the case of proceeding to step S205, the resource adjustment judging unit 17 instructs the resource instruction unit 18 in step S205 to add the virtual processor 123 to the virtual machine that has a possibility of experiencing unstable operation. The processing then proceeds to step S208.

In the case of proceeding to step S206, the resource adjustment judging unit 17 judges whether there is a virtual machine with low operation priority. When there is a virtual machine with a low operation priority (step S206: YES), the processing proceeds to step S207. When there is no virtual machine with a low operation priority (step S206: NO), the processing proceeds to step S212. The processing in step S206 is similar to the processing in step S106 in the first embodiment.

In the case of proceeding to step S207, the resource adjustment judging unit 17 instructs the resource instruction unit 18 in step S207 to suspend the virtual machine with low operation priority, to delete the virtual processor 123 of the suspended virtual machine, and to add the deleted virtual processor 123 to the virtual machine that has a possibility of experiencing unstable operation. The resource adjustment judging unit 17 may issue these instructions to the resource instruction unit 18 sequentially instead of simultaneously.

Subsequently, in step S208, the resource instruction unit 18 transmits a command based on the instruction received from the resource adjustment judging unit 17 to the virtualization unit 12. In other words, in the case of proceeding to step S208 from step S205, this command includes a command to add the virtual processor to the virtual machine that has a possibility of experiencing unstable operation. In the case of proceeding to step S208 from step S207, however, this command includes a command to suspend the virtual machine with a low operation priority, a command to delete the virtual processor 123 of the suspended virtual machine, and a command to add the deleted virtual processor 123 to the virtual machine that has a possibility of experiencing unstable operation.

Subsequently, in step S209, the virtualization unit 12 executes the command received from the resource instruction unit 18.

Subsequently, in step S210, the self-diagnostic unit 155 diagnoses whether the possibility of unstable operation has been resolved in the virtual machine to which the virtual processor 123 was added. When the possibility of unstable operation has been resolved (step S210: YES), the processing proceeds to step S211. When the possibility of unstable operation has not been resolved (step S210: NO), the self-diagnostic unit 155 waits for a predetermined designated time and then executes the processing of step S210 again.

Subsequently, in step S211, the virtualization unit 12 releases the added virtual processor 123. The processing then proceeds to step S215.

In the case of proceeding to step S212, the self-diagnostic unit 155 detects a diagnostic index related to processing of the real-time communication unit 151 in the virtual machine that has a possibility of experiencing unstable operation and judges whether the value of the diagnostic index exceeds a second threshold in step S212. When the value of the diagnostic index exceeds the second threshold (step S212: YES), the processing proceeds to step S213. When the value of the diagnostic index does not exceed the second threshold (step S212: NO), the processing jumps to step S215 of FIG. 11.

Subsequently, after receiving notification from the self-diagnostic unit 155 that the value of the diagnostic index exceeds the second threshold, the real-time communication interface 152 adjusts the time interval for processing communication requests from the application unit 141 in step S213. For example, the real-time communication interface 152 waits for a designated time. The designated time can be determined in advance. Computational resources are thereby allocated to other processing in the real-time communication unit 151 and to processing of the application unit 141, reducing the processing load of the real-time communication unit 151 as compared to when the real-time communication interface 152 is not in a wait state. After the designated time elapses from when the real-time communication interface 152 starts waiting, computational resources are again allocated to the real-time communication interface 152.

Subsequently, in step S214, a diagnosis is performed to determine whether the possibility of unstable operation has been resolved in the virtual machine for which the time interval was adjusted in step S213. When the possibility of unstable operation has been resolved (step S214: YES), the processing proceeds to step S215. When the possibility of unstable operation has not been resolved (step S214: NO), the self-diagnostic unit 155 waits for a predetermined designated time and then executes the processing of step S214 again.

Referring to FIG. 11, the real-time communication interface 152 judges in step S215 whether there is a transmission frame requested by the application unit 141. When there is a transmission frame (step S215: YES), the processing proceeds to step S216. When there is no transmission frame (step S215: NO), the processing jumps to step S218. The processing in step S215 is similar to the processing in step S112 in the first embodiment.

In the case of proceeding to step S216, the real-time communication interface 152 retrieves one transmission frame from the request buffer 158 in step S216. The processing in step S216 is similar to the processing in step S113 in the first embodiment.

Subsequently, in step S217, the real-time communication interface 152 stores the transmission frame retrieved in step S216 in the transmission buffer 154. As in the first embodiment, the transmission frames stored in the transmission buffer 154 are sequentially transmitted by the real-time communication unit 151.

Next, in step S218, the real-time communication interface 152 judges whether to end real-time communication. When real-time communication is to be ended (step S218: YES), the processing of the flowchart ends. When real-time communication is not to be ended (step S218: NO), the processing returns to step S201, and the above-described processing is repeated. The processing in step S218 is similar to the processing in step S115 in the first embodiment.

The following effects are obtained with the present embodiment in addition to the effects of the first embodiment. When there is no virtual machine with low operation priority, the virtual machine that has a possibility of experiencing unstable operation need not be cut off from the network in the present embodiment. Rather, the time interval for the real-time communication interface to process communication requests from the application unit is adjusted, enabling a reduction in the possibility of unstable operation occurring on the virtual machine.

Third Embodiment

Figure 12:
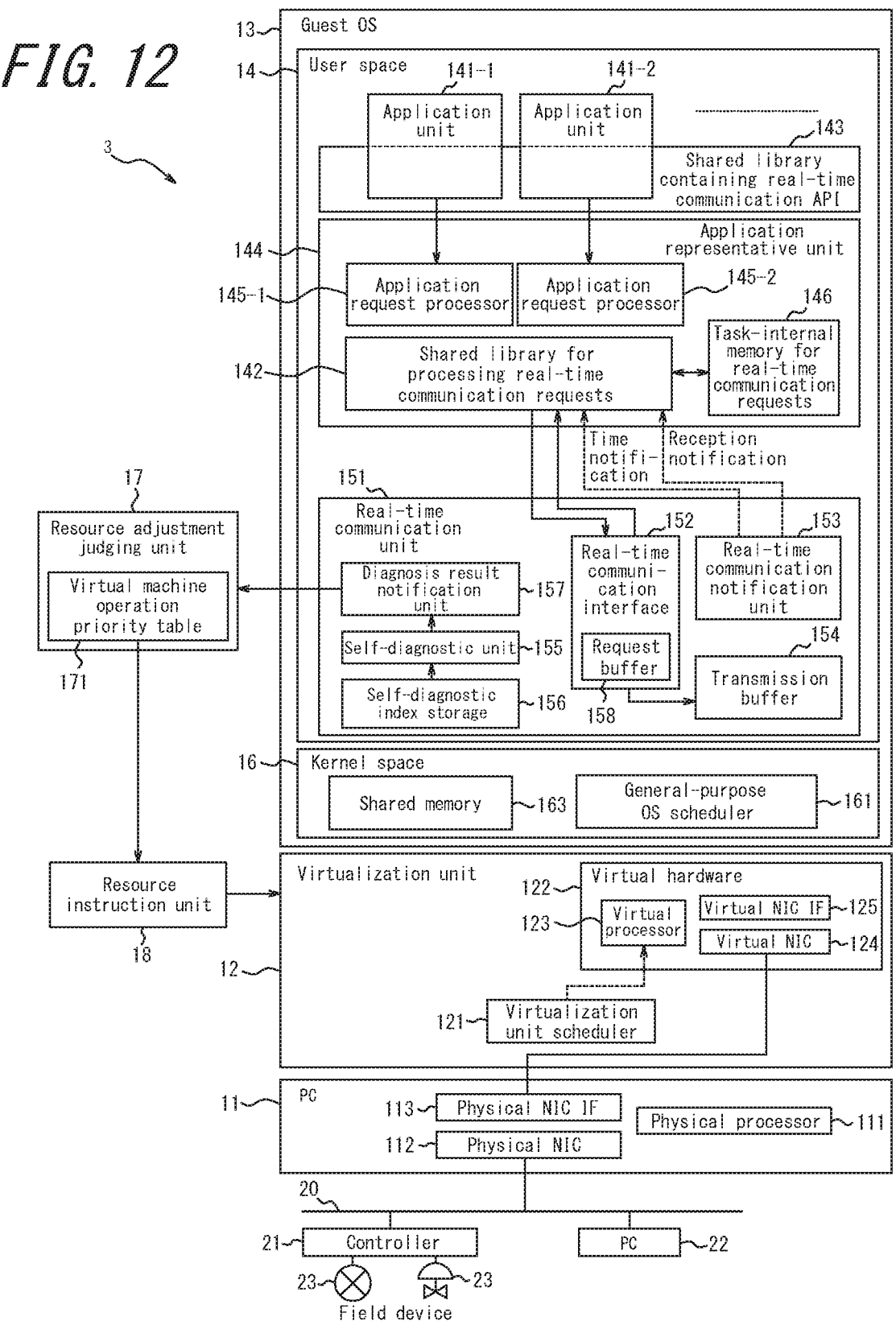
FIG. 12 is a functional block diagram illustrating the configuration of a communication processing apparatus according to a third embodiment.

Next, a third embodiment of the present disclosure is described. A description of some of the matter already described in the first and second embodiments is omitted, FIG. 12 is a functional block diagram illustrating the functional configuration of a communication processing apparatus 3 in a production control system according to the present embodiment. The communication processing apparatus 3 is configured on a virtualized PC 11, as in the first and second embodiments.

A general-purpose OS scheduler 161 and a shared memory 163 are located in a kernel space 16 of a guest OS 13. The general-purpose OS scheduler 161 is similar to the first and second embodiments. The shared memory 163 is used as appropriate when information is to be shared between tasks. In the present embodiment, a task-internal memory 146 for real-time communication requests is located inside an application representative unit 144, described below. It is therefore unnecessary to provide a buffer inside the shared memory 163 for temporarily storing communication requests from application units 141.

Application units 141-1, 141-2, . . . (application units 141), a shared library 143 containing a real-time communication API, the application representative unit 144, and a real-time communication unit 151 are located in the user space 14 of the guest OS 13. The application unit 141, the shared library 143 containing the real-time communication API, and the real-time communication unit 151 are respectively similar to the application unit 141, the shared library 143 containing the real-time communication API, and the real-time communication unit 151 in the first and second embodiments. The application representative unit 144 is described below in detail.

The application representative unit 144 includes application request processors 145-1, 145-2, . . . (application representative unit 145), a library 142 for processing real-time communication requests, and the task-internal memory 146 for real-time communication requests. The application representative unit 144 operates as a task independent from the application units 141.

The application request processors 145 are provided in correspondence with the application units 141. The application request processor 145 handles communication requests for transmission and reception from the corresponding application unit 141, serving as a bridge to the library 142 for processing real-time communication requests. A plurality of application request processors 145 may be associated with one application unit 141. In this case, an application request processor 145 can be provided for each communication type or each communication direction, for example. The plurality of application request processors 145 operate in parallel using computational resources allocated to tasks.

Via the application request processors 145, the library 142 for processing real-time communication requests receives communication requests from the application units 141 and temporarily stores the received communication requests in the task-internal memory 146 for real-time communication requests. Subsequently, communication requests retrieved from the task-internal memory 146 for real-time communication requests are passed to the real-time communication unit 151.

The task-internal memory 146 for real-time communication requests is a storage belonging to a dedicated area of the task of the application representative unit 144. The task-internal memory 146 for real-time communication requests includes a buffer for temporarily storing communication requests.

Communication requests and their acknowledgements are passed between the application units 141 and the application request processors 145, or between the library 112 for processing real-time communication requests and the real-time communication unit 151, by interprocess communication (IPC).

In the present embodiment, a time notification and a receipt notification are provided from the real-time communication notification unit 153 of the real-time communication unit 151 to the library 142 for processing real-time communication requests. As a modification, the application representative unit 144 itself may set a timer within its own task and receive time notification by expiration of the timer, for example. In this case, only a receipt notification is provided from the real-time communication notification unit 153 to the library 142 for processing real-time communication requests, and the time notification becomes unnecessary.

The following effects are obtained with the present embodiment in addition to the effects of the first and second embodiments. In the present embodiment, unlike the first and second embodiments, a communication request from a certain application is not stored in a buffer inside the shared memory for real-time communication requests, to which all application units have read/write access, but rather is stored in a buffer inside a task-internal memory for real-time communication requests. The communication request can only be read or written by the application representative unit. Consequently, one application unit does not interfere with the communication request of another application unit. Safety is thereby ensured. In the present embodiment, "interfere" refers to reading or overwriting a communication request without permission. In other words, the present embodiment can protect application units from the risk of transmission/reception frames being tampered with or spied on.

The present disclosure is based on drawings and embodiments, but it should be noted that a person of ordinary skill in the art could make a variety of changes or modifications based on the present disclosure. Therefore, such changes and modifications are to be understood as included within the scope of the present disclosure. For example, the functions and the like included in the various steps and the like may he reordered in any logically consistent way. Furthermore, a plurality of steps or the like may be combined into one, or a single step or the like may be divided.

For example, the PC 11 includes only one set of the physical NIC 112 and the physical NIC IF 113 in the above embodiments. As a modification, the PC 11 may include a plurality of sets of the physical NIC 112 and the physical NIC IF 113. The PC 11 may, in other words, include a plurality of communication systems connected to a physical network. In this case, the PC 11 may simultaneously use these communication systems to communicate. The PC 11 may consider these communication systems to be redundant information, and when failure or the like occurs in one of the communication systems, the PC 11 may communicate using another communication system.

A general-purpose communication processing apparatus can be caused to function as the communication processing apparatus according to the above embodiments. Specifically, a program containing processing content for implementing the functions of the communication processing apparatus according to the above embodiments may be stored in the memory of a communication processing apparatus, and the processor of the communication processing apparatus may read and execute the program.

INDUSTRIAL APPLICABILITY

The present disclosure can, for example, be applied to devices that communicate in real time. For example, the present disclosure can be used in a communication processing apparatus for managing and controlling a plant or the like. The scope of application of the present disclosure is not, however, limited to the disclosed examples.

The invention claimed is:

1. A communication processing apparatus to be used in a production control system, the communication processing apparatus comprising at least one physical processor for performing functions of an application unit, a real-time communication unit, and a resource adjustment judging unit, wherein the application unit and the real-time communication unit operates on each virtual machine among a plurality of virtual machines implemented by a virtualization unit included in a computer;
wherein the real-time communication unit detects a diagnostic index related to communication processing and to provide a notification of a possibility of unstable operation to the resource adjustment judging unit when a value of the diagnostic index exceeds a predetermined threshold; and
wherein the resource adjustment judging unit
determine whether a virtual processor is free when the notification is received from the real-time communication unit;
instructs the virtualization unit to add the virtual processor to the virtual machine that has the possibility of unstable operation when the virtual processor is free; and
instructs the virtualization unit to add a virtual processor allocated to a virtual machine with low operation priority to the virtual machine that has the possibility of unstable operation when no virtual processor is free,
wherein the real-time communication unit provides the notification of the possibility of unstable operation to the resource adjustment judging unit when the value of the diagnostic index exceeds a first threshold; and
wherein the real-time communication unit adjusts a time interval for processing a communication request from the application unit when the value of the diagnostic index exceeds a second threshold,
wherein the first threshold is set lower than the second threshold.

2. The communication processing apparatus of claim 1, wherein the at least one physical processor further performs functions of an application representative unit, wherein the application representative unit:
operates as a task independent from the application unit, receives a communication request from the application unit,
stores the communication request in a dedicated storage in the task, and
retrieves the communication request from the storage and passes the communication request to the real-time communication unit.

3. The communication processing apparatus of claim 1, wherein the real-time communication unit operates as a task independent from the application unit.

4. The communication processing apparatus of claim 1, wherein the resource adjustment judging unit instructs the virtualization unit to suspend the virtual machine with low operation priority, to delete the virtual processor allocated to the suspended virtual machine, and to add the deleted virtual processor to the virtual machine that has the possibility of unstable operation when no virtual processor is free.

5. The communication processing apparatus of claim 1, wherein the resource adjustment judging unit instructs the virtualization unit to delete the virtual processor allocated to the virtual machine with low operation priority, and to add the deleted virtual processor to the virtual machine that has the possibility of unstable operation when no virtual processor is free.

6. A non-transitory computer-readable recording medium comprising instructions which, when executed by a computer, cause the computer to function as the communication processing apparatus of claim 1.

7. A communication processing method using a communication processing apparatus in a production control system, the communication processing apparatus comprising an application unit and a real-time communication unit operating on each virtual machine among a plurality of virtual machines implemented by a virtualization unit included in a computer, the communication processing method comprising:
detecting, using the real-time communication unit, a diagnostic index related to communication processing and providing a notification of a possibility of unstable operation to a resource adjustment judging unit when a value of the diagnostic index exceeds a predetermined threshold;
determining, using the resource adjustment judging unit, whether a virtual processor is free when the notification is received from the real-time communication unit;
instructing the virtualization unit, using the resource adjustment judging unit, to add the virtual processor to the virtual machine that has the possibility of unstable operation when the virtual processor is free; and
instructing the virtualization unit, using the resource adjustment judging unit, to add a virtual processor allocated to a virtual machine with low operation priority to the virtual machine that has the possibility of unstable operation when no virtual processor is free, the communication processing method further comprising:

providing, using the real-time communication unit, the notification of the possibility of unstable operation to the resource adjustment judging unit when the value of the diagnostic index exceeds a first threshold; and adjusting, using the real-time communication unit, a time interval for processing a communication request from the application unit when the value of the diagnostic index exceeds a second threshold, wherein the first threshold is set lower than the second threshold.

* * * * *